(12) United States Patent
Maeda

(10) Patent No.: US 12,552,992 B2
(45) Date of Patent: Feb. 17, 2026

(54) OPTICAL LAMINATE AND IMAGE DISPLAY DEVICE

(71) Applicant: FUJIFILM Corporation, Tokyo (JP)

(72) Inventor: Yoshinori Maeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 254 days.

(21) Appl. No.: 18/184,342

(22) Filed: Mar. 15, 2023

(65) Prior Publication Data
US 2023/0303929 A1    Sep. 28, 2023

(30) Foreign Application Priority Data

Mar. 22, 2022   (JP) .................................. 2022-045416

(51) Int. Cl.
| | |
|---|---|
| C09K 19/56 | (2006.01) |
| C09K 19/38 | (2006.01) |
| C09K 19/60 | (2006.01) |
| G02B 5/30 | (2006.01) |
| G02F 1/1335 | (2006.01) |
| G02F 1/13363 | (2006.01) |
| H10K 59/80 | (2023.01) |

(52) U.S. Cl.
CPC .......... *C09K 19/56* (2013.01); *C09K 19/3857* (2013.01); *C09K 19/601* (2013.01); *G02B 5/3016* (2013.01); *G02F 1/133528* (2013.01); *G02F 1/133638* (2021.01); *G02F 2202/08* (2013.01); *G02F 2413/01* (2013.01); *H10K 59/8791* (2023.02)

(58) Field of Classification Search
None
See application file for complete search history.

(56) References Cited

U.S. PATENT DOCUMENTS

| | | | |
|---|---|---|---|
| 2019/0071571 A1 | 3/2019 | Takada et al. | |
| 2020/0326590 A1* | 10/2020 | Shibata | ................... B32B 27/00 |
| 2021/0026195 A1* | 1/2021 | Kuwayama | ........... G02F 1/1337 |

FOREIGN PATENT DOCUMENTS

| | | |
|---|---|---|
| JP | 2005-309362 A | 11/2005 |
| WO | 2017/195833 A1 | 11/2017 |

OTHER PUBLICATIONS

Denacol™ Acrylate data sheet from Nagase Chemtex Corp. (Year: 2025).*

Office Action, which was issued by the Japanese Patent Office on Nov. 4, 2025, in connection with Japanese Patent Application No. 2022-045416.

* cited by examiner

*Primary Examiner* — Ramsey Zacharia
(74) *Attorney, Agent, or Firm* — Edwards Neils LLC; Jean C. Edwards, Esq.

(57) ABSTRACT

Provided is an optical laminate that has excellent uniformity and is capable of suppressing a change in tint of reflected light during black display in a case where the optical laminate is used for an image display device, and an image display device formed of the optical laminate. The optical laminate includes a light absorption anisotropic layer containing a dichroic substance, a photo-alignment film, and a base material in order, in which the photo-alignment film contains a specific compound having a refractive index of 1.55 to 1.70, and the base material has a glass transition temperature of 150° C. or higher.

7 Claims, No Drawings

OPTICAL LAMINATE AND IMAGE DISPLAY DEVICE

CROSS-REFERENCE TO RELATED APPLICATIONS

The present application claims priority under 35 U.S.C. § 119 to Japanese Patent Application No. 2022-045416, filed on Mar. 22, 2022. The above application is hereby expressly incorporated by reference, in its entirety, into the present application.

BACKGROUND OF THE INVENTION

1. Field of the Invention

The present invention relates to an optical laminate and an image display device.

2. Description of the Related Art

In the related art, in a case where an attenuation function, a polarization function, a scattering function, a light-shielding function of irradiation light including laser light or natural light is required, a device that is operated according to principles different for each function is used. Therefore, products corresponding to the above-described functions are also produced by production steps different for each function.

For example, a linear polarizer or a circular polarizer is used in an image display device (for example, a liquid crystal display device) to control optical revolution or birefringence in display. Further, a circular polarizer is used in an organic light emitting diode (OLED) to prevent reflection of external light.

In the related art, iodine has been widely used as a dichroic substance in these polarizers, but a polarizer that uses an organic coloring agent in place of iodine as a dichroic substance has also been examined.

For example, WO2017/195833A describes a light absorption anisotropic film (layer) formed of a composition that contains a dichroic substance having a predetermined structure ([Claim 1] and [Claim 14]).

SUMMARY OF THE INVENTION

As a result of examination on an optical laminate including the light absorption anisotropic layer described in WO2017/195833A, the present inventors found that a change in tint (coloration) may occur in reflected light during black display in a case where components of the light absorption anisotropic layer are used for an image display device.

Further, the present inventors found that the uniformity of the optical laminate to be prepared may be degraded depending on the components of the light absorption anisotropic layer and the kind of a base material.

Therefore, an object of the present invention is to provide an optical laminate that has excellent uniformity and is capable of suppressing a change in tint of reflected light during black display in a case where the optical laminate is used for an image display device, and an image display device formed of the optical laminate.

As a result of intensive examination conducted by the present inventors in order to achieve the above-described object, it was found that in a case where an optical laminate including a light absorption anisotropic layer containing a dichroic substance, a photo-alignment film, and a base material in order is provided, a specific compound having a refractive index of 1.55 to 1.70 is blended into the photo-alignment film, and a base material having a glass transition temperature of 150° C. or higher is used, the uniformity is excellent and a change in tint of reflected light during black display can be suppressed in a case where the optical laminate is used for an image display device, thereby completing the present invention.

That is, the present inventors found that the above-described object can be achieved by employing the following configurations.

[1] An optical laminate comprising: a light absorption anisotropic layer containing a dichroic substance; a photo-alignment film; and a base material in order, in which the photo-alignment film contains a specific compound having a refractive index of 1.55 to 1.70, and the base material has a glass transition temperature of 150° C. or higher.

[2] The optical laminate according to [1], in which the specific compound has a molecular weight of 1,000 or less.

[3] The optical laminate according to [1] or [2], in which the specific compound is a compound represented by any of Formulae (1) to (3).

[4] The optical laminate according to [3], in which B in Formula (1) represents a group represented by Formula (4).

[5] The optical laminate according to [3] or [4], in which A in Formula (1) represents a dicarboxylic acid residue represented by Formula (5).

[6] The optical laminate according to any one of [1] to [5], in which a content of the specific compound contained in the photo-alignment film is in a range of 0.1 to 150 mg/cm$^3$.

[7] The optical laminate according to any one of [1] to [6], in which the dichroic substance includes at least two kinds of dichroic substances having a maximal absorption wavelength in a wavelength range of 550 to 700 nm.

[8] The optical laminate according to any one of [1] to [7], in which a content of the dichroic substance having a maximal absorption wavelength in a wavelength range of 550 to 700 nm, which is contained in the light absorption anisotropic layer, is in a range of 20 to 400 mg/cm$^3$.

[9] The optical laminate according to any one of [1] to [8], in which the base material consists of a cellulose acylate-based film that satisfies at least one of Condition 1 or Condition 2.
  Condition 1: the cellulose acylate-based film contains 1% to 20% by mass of a compound represented by Formula (1)
  Condition 2: the cellulose acylate-based film contains 0.1% to 10% by mass of a compound represented by Formula (2) or (3)

[10] The optical laminate according to [9], in which a distribution of a content of at least one of a sodium ion or a potassium ion contained in the base material in a thickness direction is a distribution in which a content in a surface layer portion corresponding to 1% of a thickness from a surface of the base material on a side of the photo-alignment film is three or more times a content in a central portion of the base material in the thickness direction.

[11] The optical laminate according to any one of [1] to [10], further comprising: a k/4 plate on a side of the light absorption anisotropic layer opposite to the photo-alignment film.

[12] An optical laminate comprising: a laminate obtained by peeling off the base material from the optical laminate according to any one of [1] to [9]; and a k/4 plate provided on the photo-alignment film in the laminate.

[13] An image display device comprising: the optical laminate according to [11] or [12].

According to the present invention, it is possible to provide an optical laminate that has excellent uniformity and is capable of suppressing a change in tint of reflected light during black display in a case where the optical laminate is used for an image display device, and an image display device formed of the optical laminate.

DESCRIPTION OF THE PREFERRED EMBODIMENTS

Hereinafter, the present invention will be described in detail.

The description of constituent requirements described below may be made based on typical embodiments of the present invention, but the present invention is not limited to such embodiments.

In addition, in the present specification, a numerical range shown using "to" indicates a range including numerical values described before and after "to" as a lower limit and an upper limit.

Further, in the present specification, substances corresponding to respective components may be used alone or in combination of two or more kinds thereof. Here, in a case where two or more kinds of substances corresponding to respective components are used in combination, the content of the components indicates the total content of the combined substances unless otherwise specified.

Further, in the present specification, the term "(meth) acryl" denotes "acryl" or "methacryl".

In the present specification, the concept of "may have a substituent" includes not only an aspect of having no substituent but also an aspect of having one or more substituents.

Here, examples of the substituent include those described in the substituent group A below.

Substituent Group A

Examples of the substituent group A include a halogen atom (such as a fluorine atom, a chlorine atom, or a bromine atom, preferably a chlorine atom or a fluorine atom, and more preferably a fluorine atom), an alkyl group (a linear, branched, or cyclic alkyl group having preferably 1 to 48 carbon atoms, more preferably 1 to 24 carbon atoms, and particularly preferably 1 to 8 carbon atoms, and examples thereof include a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, and a 1-adamantyl group), an alkenyl group (an alkenyl group having preferably 2 to 48 carbon atoms and more preferably 2 to 18 carbon atoms, and examples thereof include a vinyl group, an allyl group, and a 3-butene-1-yl group), an aryl group (an aryl group having preferably 6 to 48 carbon atoms and more preferably 6 to 24 carbon atoms, and examples thereof include a phenyl group and a naphthyl group), a heterocyclic group (a heterocyclic group having preferably 1 to 32 carbon atoms and more preferably 1 to 18 carbon atoms, and examples thereof include a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazole-1-yl group), a silyl group (a silyl group having preferably 3 to 38 carbon atoms and more preferably 3 to 18 carbon atoms, and examples thereof include a trimethylsilyl group, a triethylsilyl group, a tributylsilyl group, a t-butyldimethylsilyl group, and a t-hexyldimethylsilyl group), a hydroxy group, a cyano group, a nitro group, an alkoxy group (an alkoxy group having preferably 1 to 48 carbon atoms and more preferably 1 to 24 carbon atoms, examples thereof include a methoxy group, an ethoxy group, a 1-butoxy group, a 2-butoxy group, an isopropoxy group, a t-butoxy group, a dodecyloxy group, and a cycloalkyloxy group, and examples thereof include a cyclopentyloxy group and a cyclohexyloxy group), an aryloxy group (an aryloxy group having preferably 6 to 48 carbon atoms and more preferably 6 to 24 carbon atoms, and examples thereof include a phenoxy group and a 1-naphthoxy group), a heterocyclic oxy group (a heterocyclic oxy group having preferably 1 to 32 carbon atoms and more preferably 1 to 18 carbon atoms, and examples thereof include a 1-phenyltetrazole-5-oxy group and a 2-tetrahydropyranyloxy group), a silyloxy group (a silyloxy group having preferably 1 to 32 carbon atoms and more preferably 1 to 18 carbon atoms, and examples thereof include a trimethylsilyloxy group, a t-butyldimethylsilyloxy group, and a diphenylmethylsilyloxy group), an acyloxy group (an acyloxy group having preferably 2 to 48 carbon atoms and more preferably 2 to 24 carbon atoms, and examples thereof include an acetoxy group, a pivaloyloxy group, a benzoyloxy group, and a dodecanoyloxy group), an alkoxycarbonyloxy group (an alkoxycarbonyloxy group having preferably 2 to 48 carbon atoms and more preferably 2 to 24 carbon atoms, examples thereof include an ethoxycarbonyloxy group, a t-butoxycarbonyloxy group, and a cycloalkyloxycarbonyloxy group, and examples thereof include a cyclohexyloxycarbonyloxy group), an aryloxycarbonyloxy group (an aryloxycarbonyloxy group having preferably 7 to 32 carbon atoms and more preferably 7 to 24 carbon atoms, and examples thereof include a phenoxycarbonyloxy group), a carbamoyloxy group (a carbamoyloxy group having preferably 1 to 48 carbon atoms and more preferably 1 to 24 carbon atoms, and examples thereof include a N,N-dimethylcarbamoyloxy group, a N-butylcarbamoyloxy group, a N-phenyl carbamoyloxy group, and a N-ethyl-N-phenylcarbamoyloxy group), a sulfamoyloxy group (a sulfamoyloxy group having preferably 1 to 32 carbon atoms and more preferably 1 to 24 carbon atoms, and examples thereof include a N,N-diethylsulfamoyloxy group and a N-propylsulfamoyloxy group), an alkylsulfonyloxy group (an alkylsulfonyloxy group having preferably 1 to 38 carbon atoms and more preferably 1 to 24 carbon atoms, and examples thereof include a methylsulfonyloxy group, a hexadecylsulfonyloxy group, and a cyclohexylsulfonyloxy group), an arylsulfonyloxy group (an arylsulfonyloxy group having preferably 6 to 32 carbon atoms and more preferably 6 to 24 carbon atoms, and examples thereof include a phenylsulfonyloxy group), an acyl group (an acyl group having preferably 1 to 48 carbon atoms and more preferably 1 to 24 carbon atoms, and examples thereof include a formyl group, an acetyl group, a pivaloyl group, a benzoyl group, a tetradecanoyl group, and a cyclohexanoyl group), an alkoxycarbonyl group (an alkoxycarbonyl group having preferably 2 to 48 carbon atoms and more preferably 2 to 24 carbon atoms, and examples thereof include a methoxycarbonyl group, an ethoxycarbonyl group, an octadecyloxycarbonyl group, a cyclohexyloxycarbonyl group, and a 2,6-di-tert-butyl-4-methylcyclohexyloxycarbonyl group), an aryloxycarbonyl group (an aryloxycarbonyl group having preferably 7 to 32 carbon atoms and more preferably 7 to 24 carbon atoms, and examples thereof include a phenoxycarbonyl group), a carbamoyl group (a carbamoyl group having preferably 1 to 48 carbon atoms and more preferably 1 to 24 carbon atoms, and examples thereof include a carbamoyl group, a N,N-diethylcarbamoyl group, a N-ethyl-N-octylcarbamoyl group, a N,N-dibutylcarbamoyl group, a N-propylcarbamoyl group, a N-phenylcarbamoyl group, a N-methyl-N-phenylcarbamoyl group, and a N,N-dicyclohexylcarbamoyl group), an amino group (an amino group having preferably 32 or less carbon atoms and more preferably 24 or less carbon atoms, and examples thereof include an amino group, a methylamino group, a N,N-dibutylamino group, a tetradecylamino group, a 2-ethylhexylamino group, and a cyclohexylamino group), an anilino group (an anilino group having preferably 6 to 32 carbon atoms and more preferably 6 to 24 carbon atoms, and examples thereof include an anilino group and a N-methylanilino group), a heterocyclic amino group (a heterocyclic amino group having preferably 1 to 32 carbon atoms and more preferably 1 to 18 carbon atoms, and examples thereof include a 4-pyridylamino group), a carbonamide group (a carbonamide group having preferably 2 to 48 carbon atoms and more preferably 2 to 24 carbon atoms, and examples thereof include an acetamide group, a benzamide group, a tetradecaneamide group, a pivaloylamide group, and a cyclohexaneamide group), a ureido group (a ureido group having preferably 1 to 32 carbon atoms and more preferably 1 to 24 carbon atoms, and examples thereof include a ureido group, a N,N-dimethylureido group, and a N-phenylureido group), an imide group (an imide group having preferably 36 or less carbon atoms and more preferably 24 or less carbon atoms, and examples thereof include a N-succinimide group and a N-phthalimide group), an alkoxycarbonylamino group (an alkoxycarbonylamino group having preferably 2 to 48 carbon atoms and more preferably 2 to 24 carbon atoms, and examples thereof include a methoxycarbonylamino group, an ethoxycarbonylamino group, a t-butoxycarbonylamino group, an octadecyloxycarbonylamino group, and a cyclohexyloxycarbonylamino group), an aryloxycarbonylamino group (an aryloxycarbonylamino group having preferably 7 to 32 carbon atoms and more preferably 7 to 24 carbon atoms, and examples thereof include a phenoxycarbonylamino group), a sulfonamide group (a sulfonamide group having preferably 1 to 48 carbon atoms and more preferably 1 to 24 carbon atoms, and examples thereof include a methanesulfonamide group, a butanesulfonamide group, a benzenesulfonamide group, a hexadecanesulfonamide group, and a cyclohexanesulfonamide group), a sulfamoylamino group (a sulfamoylamino group having preferably 1 to 48 carbon atoms and more preferably 1 to 24 carbon atoms, and examples thereof include a N,N-dipropylsulfamoylamino group and a N-ethyl-N-dodecylsulfamoylamino group), an azo group (an azo group having preferably 1 to 32 carbon atoms and more preferably 1 to 24 carbon atoms, and examples thereof include a phenylazo group and a 3-pyrazolylazo group), an alkylthio group (an alkylthio group having preferably 1 to 48 carbon atoms and more preferably 1 to 24 carbon atoms, and examples thereof include a methylthio group, an ethylthio group, an octylthio group, and a cyclohexylthio group), an arylthio group (an arylthio group having preferably 6 to 48 carbon atoms and more preferably 6 to 24 carbon atoms, and examples thereof include a phenylthio group), a heterocyclic thio group (a heterocyclic thio group having preferably 1 to 32 carbon atoms and more preferably 1 to 18 carbon atoms, and examples thereof include a 2-benzothiazolylthio group, a 2-pyridylthio group, and a 1-phenyltetrazolylthio group), an alkylsulfinyl group (an alkylsulfinyl group having preferably 1 to 32 carbon atoms and more preferably 1 to 24 carbon atoms, and examples thereof include a dodecanesulfinyl group), an arylsulfinyl group (an arylsulfinyl group having preferably 6 to 32 carbon atoms and more preferably 6 to 24 carbon atoms, and examples thereof include a phenylsulfinyl group), an alkylsulfonyl group (an alkylsulfonyl group having preferably 1 to 48 carbon atoms and more preferably 1 to 24 carbon atoms, and examples thereof include a methylsulfonyl group, an ethylsulfonyl group, a propylsulfonyl group, a butylsulfonyl group, an isopropylsulfonyl group, a 2-ethylhexylsulfonyl group, a hexadecylsulfonyl group, an octylsulfonyl group, and a cyclohexylsulfonyl group), an arylsulfonyl group (an arylsulfonyl group having preferably 6 to 48 carbon atoms and more preferably 6 to 24 carbon atoms, and examples thereof include a phenylsulfonyl group and a 1-naphthylsulfonyl group), a sulfamoyl group (a sulfamoyl group having preferably 32 or less carbon atoms and more preferably 24 or less carbon atoms, and examples thereof include a sulfamoyl group, a N,N-dipropylsulfamoyl group, a N-ethyl-N-dodecylsulfamoyl group, a N-ethyl-N-phenylsulfamoyl group, a N-cyclohexylsulfamoyl group, and a N-(2-ethylhexyl)sulfamoyl group), a phosphonyl group (a phosphonyl group having preferably 1 to 32 carbon atoms and more preferably 1 to 24 carbon atoms, and examples thereof include a phenoxyphosphonyl group, an octyloxyphosphonyl group, and a phenylphosphonyl group), a phosphinoylamino group (a phosphinoylamino group having preferably 1 to 32 carbon atoms and more preferably 1 to 24 carbon atoms, and examples thereof include a diethoxyphosphinoylamino group and a dioctyloxyphosphinoylamino group), an epoxy group, a (meth)acryloyl group, —NHCOCH$_3$, —SO$_2$NHC$_2$H$_4$OCH$_3$, and —NHSO$_2$CH$_3$.

Optical Laminate

An optical laminate according to the embodiment of the present invention is an optical laminate including a light absorption anisotropic layer containing a dichroic substance, a photo-alignment film, and a base material in order.

Further, the photo-alignment film of the optical laminate according to the embodiment of the present invention contains a specific compound having a refractive index of 1.55 to 1.70.

Further, the base material of the optical laminate according to the embodiment of the present invention has a glass transition temperature of 150° C. or higher.

In the present invention, as described above, in a case where a specific compound having a refractive index of 1.55 to 1.70 is blended into the photo-alignment film, and a base material having a glass transition temperature of 150° C. or higher is used, the uniformity is excellent and a change in tint of reflected light during black display can be suppressed in a case where the optical laminate is used for an image display device.

The reason for this is not clear, but the present inventors presume as follows.

That is, in the present invention, it is considered that in a case where a specific compound having a refractive index of 1.55 to 1.70 is blended into the photo-alignment film, a difference in refractive index between the photo-alignment film and the light absorption anisotropic layer is decreased and the interfacial reflection at the interface between the light absorption anisotropic layer and the photo-alignment film is suppressed, and thus a change in tint (coloration) of reflected light during black display is suppressed.

Further, in the present invention, it is considered that in a case where a base material having a glass transition temperature of 150° C. or higher is used, wrinkles that may occur in the base material during the formation of the light absorption anisotropic layer (particularly, during fixation of the alignment state) can be suppressed, and thus the uniformity of the optical laminate is enhanced.

Hereinafter, the light absorption anisotropic layer, the photo-alignment film, the base material, and any layer configuration of the optical laminate according to the embodiment of the present invention will be described in detail.

Light Absorption Anisotropic Layer

The light absorption anisotropic layer of the optical laminate according to the embodiment of the present invention is a light absorption anisotropic layer containing a dichroic substance, and is preferably a light absorption anisotropic layer containing a liquid crystal compound together with the dichroic substance and more preferably a layer obtained by fixing the alignment state of a liquid crystal compound and a dichroic substance.

Dichroic Substance

In the present invention, the dichroic substance denotes a coloring agent having different absorbances depending on the direction. The dichroic substance may or may not exhibit liquid crystallinity.

The dichroic substance is not particularly limited, and examples thereof include a visible light absorbing substance (dichroic dye), a light emitting substance (such as a fluorescent substance or a phosphorescent substance), an ultraviolet absorbing substance, an infrared absorbing substance, a non-linear optical substance, a carbon nanotube, and an inorganic substance (for example, a quantum rod). Further, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

As the dichroic substance, a dichroic azo coloring agent compound is preferable.

The dichroic azo coloring agent compound denotes an azo coloring agent compound having different absorbances depending on the direction. The dichroic azo coloring agent compound may or may not exhibit liquid crystallinity. In a case where the dichroic azo coloring agent compound exhibits liquid crystallinity, the dichroic azo coloring agent compound may exhibit any of nematic liquid crystallinity or smectic liquid crystallinity. The temperature at which the liquid crystal phase is exhibited is preferably in a range of room temperature (approximately 20° C. to 28° C.) to 300° C. and from the viewpoints of handleability and manufacturing suitability, more preferably in a range of 50° C. to 200° C.

In the present invention, from the viewpoint of suppressing deterioration of filterability and an increase in point defects, which are caused by aging a coating solution for a long time, it is preferable to use at least two kinds of dichroic substances having a maximal absorption wavelength in a wavelength range of 550 to 700 nm.

The content of the dichroic substance having a maximal absorption wavelength in a wavelength range of 550 to 700 nm, which is contained in the light absorption anisotropic layer, is not particularly limited, but is preferably in a range of 20 to 400 mg/cm$^3$, more preferably in a range of 30 to 200 mg/cm$^3$, and still more preferably in a range of 40 to 150 mg/cm$^3$ from the viewpoint of increasing the alignment degree of the light absorption anisotropic layer to be formed. Further, in a case where a plurality of dichroic substances are used in combination, it is preferable that the total amount of the plurality of dichroic substances is in the above-described ranges.

Here, the content (mg/cm$^3$) of the dichroic substance can be acquired by measuring a solution in which the optical laminate having a light absorption anisotropic layer is dissolved, using high performance liquid chromatography (HPLC). In addition, the quantification can be performed by using the dichroic substance contained in the light absorption anisotropic layer as a standard material.

Further, the region of the light absorption anisotropic layer in the optical laminate can be specified by cross-sectional information using Time-of-Flight Secondary Ion Mass Spectrometry (TOF-SIMS) or by cross-sectional observation using a scanning electron microscope (SEM).

Further, the upper limit of the total content of the dichroic substance contained in the light absorption anisotropic layer is preferably 30% by mass or less, more preferably 29% by mass or less, still more preferably 20% by mass or less, and particularly preferably 15% by mass or less with respect to the total mass of the light absorption anisotropic layer. Further, the lower limit thereof is preferably 0.1% by mass or greater, more preferably 1% by mass or greater, and still more preferably 3% by mass or greater.

Liquid Crystal Compound

It is preferable that the light absorption anisotropic layer contains a liquid crystal compound. In this manner, the dichroic substance can be aligned with a high alignment degree while the precipitation of the dichroic substance is suppressed.

As such a liquid crystal compound, both a polymer liquid crystal compound and a low-molecular-weight liquid crystal compound can be used.

Here, "polymer liquid crystal compound" denotes a liquid crystal compound having a repeating unit in the chemical structure.

Here, "low-molecular-weight liquid crystal compound" denotes a liquid crystal compound having no repeating units in the chemical structure.

Examples of the polymer liquid crystal compound include thermotropic liquid crystal polymers described in JP2011-237513A and polymer liquid crystal compounds described in paragraphs [0012] to [0042] of WO2018/199096A.

Examples of the low-molecular-weight liquid crystal compound include liquid crystal compounds described in paragraphs [0072] to [0088] of JP2013-228706A. Among these, a liquid crystal compound exhibiting smectic properties is preferable.

Examples of such a liquid crystal compound include those described in paragraphs [0019] to [0140] of WO2022/014340A.

The content of the liquid crystal compound is preferably in a range of 50% to 99% by mass and more preferably in a range of 75% to 90% by mass with respect to the total mass of the light absorption anisotropic layer.

Other Components

The light absorption anisotropic layer may contain other components in addition to the components described above. Examples of other components include a vertical alignment agent and a leveling agent.

Examples of the vertical alignment agent include a boronic acid compound and an onium salt.

A compound represented by Formula (A) is preferable as the boronic acid compound.

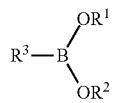

Formula (A)

In Formula (A), $R^1$ and $R^2$ each independently represent a hydrogen atom, a substituted or unsubstituted aliphatic hydrocarbon group, a substituted or unsubstituted aryl group, or a substituted or unsubstituted heterocyclic group. $R^3$ represents a substituent containing a (meth)acryl group.

Specific examples of the boronic acid compound include a boronic acid compound represented by General Formula (I) described in paragraphs [0023] to [0032] of JP2008-225281A.

A compound represented by Formula (B) is preferable as the onium salt.

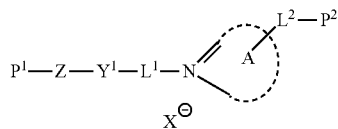

Formula (B)

In Formula (B), the ring A represents a quaternary ammonium ion consisting of a nitrogen-containing heterocyclic ring. $X^-$ represents an anion. $L^1$ represents a divalent linking group. $L^2$ represents a single bond or a divalent linking group. Yi represents a divalent linking group having a 5- or 6-membered ring as a partial structure. Further, Z represents a divalent linking group containing an alkylene group having 2 to 20 carbon atoms as a partial structure. Further, $P^1$ and $P^2$ each independently represent a monovalent substituent having a polymerizable ethylenically unsaturated bond.

Specific examples of the onium salt include the onium salts described in paragraphs [0052] to [0058] of JP2012-208397A, the onium salts described in paragraphs [0024] to [0055] of JP2008-026730A, and the onium salts described in JP2002-037777A.

In a case where the light absorption anisotropic layer contains a vertical alignment agent, the content of the vertical alignment agent is preferably in a range of 0.1% to 400% by mass and more preferably in a range of 0.5% to 350% by mass with respect to the total mass of the liquid crystal compound.

The vertical alignment agent may be used alone or in combination of two or more kinds thereof. In a case where two or more kinds of vertical alignment agents are used, the total amount thereof is preferably in the above-described ranges.

The light absorption anisotropic layer may contain a leveling agent. In a case where the composition for forming a light absorption anisotropic layer (light absorption anisotropic layer) described below contains a leveling agent, the surface roughness due to dry air applied to the surface of the light absorption anisotropic layer is suppressed, and the dichroic substance is more uniformly aligned.

The leveling agent is not particularly limited, and a leveling agent having a fluorine atom (fluorine-based leveling agent) or a leveling agent having a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent.

Specific examples of the leveling agent include the compounds described in paragraphs [0046] to [0052] of JP2004-331812A and the compounds described in paragraphs [0038] to [0052] of JP2008-257205A.

In a case where the light absorption anisotropic layer contains a liquid crystal compound and a leveling agent, the content of the leveling agent is preferably in a range of 0.001% to 10% by mass and more preferably in a range of 0.01% to 5% by mass with respect to the total mass of the liquid crystal compound.

The leveling agent may be used alone or in combination of two or more kinds thereof. In a case where two or more leveling agents are used, it is preferable that the total amount thereof is in the above-described ranges.

Composition for Forming Light Absorption Anisotropic Layer

It is preferable that the light absorption anisotropic layer is formed of a composition for forming a light absorption anisotropic layer containing a dichroic substance and a liquid crystal compound.

The composition for forming a light absorption anisotropic layer preferably contains a solvent and the like described below in addition to the dichroic substance and the liquid crystal compound, and may further contain other components described above.

Examples of the dichroic substance contained in the composition for forming the light absorption anisotropic layer include a dichroic substance that can be contained in the light absorption anisotropic layer.

It is preferable that the content of the dichroic substance with respect to the total solid content mass of the composition for forming a light absorption anisotropic layer is the same as the content of the dichroic substance with respect to the total mass of the light absorption anisotropic layer.

Here, "total solid content in the composition for forming a light absorption anisotropic layer" denotes components excluding the solvent, and specific examples of the solid content include the dichroic substance, the liquid crystal compound, and the above-described other components.

The liquid crystal compound that can be contained in the composition for forming a light absorption anisotropic layer and the other components are respectively the same as the liquid crystal compound that can be contained in the light absorption anisotropic layer and the other components.

It is preferable that the content of the liquid crystal compound and the content of other components with respect to the total solid content mass of the composition for forming a light absorption anisotropic layer are respectively the same as the content of the liquid crystal compound and the content of other components with respect to the total mass of the light absorption anisotropic layer.

From the viewpoint of the workability, it is preferable that the composition for forming a light absorption anisotropic layer contains a solvent.

Examples of the solvent include organic solvents such as ketones, ethers, aliphatic hydrocarbons, alicyclic hydrocarbons, aromatic hydrocarbons, carbon halides, esters, alcohols, cellosolves, cellosolve acetates, sulfoxides, amides, and heterocyclic compounds, and water.

These solvents may be used alone or in combination of two or more kinds thereof.

Among these solvents, organic solvents are preferable, and carbon halides or ketones are more preferable.

In a case where the composition for forming a light absorption anisotropic layer contains a solvent, the content of the solvent is preferably in a range of 80% to 99% by mass, more preferably in a range of 83% to 97% by mass, and still more preferably in a range of 85% to 95% by mass with respect to the total mass of the composition for forming a light absorption anisotropic layer.

The composition for forming a light absorption anisotropic layer may contain a polymerization initiator.

The polymerization initiator is not particularly limited, but a compound having photosensitivity, that is, a photopolymerization initiator is preferable.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

The polymerization initiator may be used alone or in combination of two or more kinds thereof.

In a case where the composition for forming a light absorption anisotropic layer contains a polymerization initiator, the content of the polymerization initiator is preferably in a range of 0.01% to 30% by mass and more preferably in a range of 0.1% to 15% by mass with respect to the total solid content of the composition for forming a light absorption anisotropic layer.

Method of Producing Light Absorption Anisotropic Layer

A method of producing the light absorption anisotropic layer is not particularly limited, but a method including a step of coating the photo-alignment film described below with the composition for forming a light absorption anisotropic layer that contains a dichroic substance and the liquid crystal compound to form a coating film (hereinafter, also referred to as "coating film forming step") and a step of aligning a liquid crystal component contained in the coating film (hereinafter, also referred to as "aligning step") in this order (hereinafter, also referred to as "present production method") is preferable from the viewpoint of further increasing the alignment degree of the dichroic substance.

Further, the liquid crystal component is a component that contains not only the liquid crystal compound described above but also a dichroic substance having liquid crystallinity.

Hereinafter, each step will be described.

The coating film forming step is a step of coating the photo-alignment film described below with the composition for forming a light absorption anisotropic layer to form a coating film.

The photo-alignment film described below is easily coated with the composition for forming a light absorption anisotropic layer by using the composition for forming a light absorption anisotropic layer which contains the above-described solvent or using a liquid-like material such as a melt obtained by heating the composition for forming a light ab sorption anisotropic layer.

Examples of the method of coating the film with the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

The aligning step is a step of aligning the liquid crystal component (particularly, the dichroic substance) contained in the coating film. In the aligning step, the dichroic substance is considered to be aligned along the liquid crystal compound aligned by the alignment film.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

It is preferable that the aligning step includes a heat treatment. In this manner, the dichroic substance contained in the coating film is further aligned, and the alignment degree of the dichroic substance is further increased.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the dichroic substance contained in the coating film is further fixed, and the alignment degree of the dichroic substance is further increased. The cooling means is not particularly limited and can be performed according to a known method.

The light absorption anisotropic layer according to the embodiment of the present invention can be obtained by performing the above-described steps.

The present production method may include a step of curing the light absorption anisotropic layer after the aligning step (hereinafter, also referred to as "curing step").

The curing step is performed by, for example, heating the film and/or irradiating (exposing) the film with light. Between these, it is preferable that the curing step is performed by irradiating the layer with light.

Various light sources such as infrared rays, visible light, and ultraviolet rays can be used as the light source for curing, but ultraviolet rays are preferable. In addition, ultraviolet rays may be applied while the layer is heated during curing, or ultraviolet rays may be applied through a filter that transmits only a specific wavelength.

Further, the exposure may be performed under a nitrogen atmosphere. In a case where the curing of the light absorption anisotropic layer proceeds by radical polymerization, since the inhibition of polymerization by oxygen is reduced, it is preferable that exposure is performed in a nitrogen atmosphere.

The thickness of the light absorption anisotropic layer is not particularly limited, but is preferably in a range of 0.05 to 5 µm and more preferably in a range of 0.1 to 2 µm.

Photo-Alignment Film

The photo-alignment film of the optical laminate according to the embodiment of the present invention is a photo-alignment film containing a specific compound with a refractive index of 1.55 to 1.70, and known photo-alignment films of the related art, except for containing the following specific compounds, can be used.

The photo-alignment compound used for a photo-alignment film is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, and photocrosslinkable polyimides, polyamides, or esters described in JP2003-520878A, JP2004-529220A, and JP4162850B. Among these, azo compounds, photocrosslinkable polyimides, polyamides, or esters are more preferable.

Among these, a photosensitive compound containing a photoreactive group that is generated by at least one of dimerization or isomerization due to the action of light is preferably used as the photo-alignment compound.

Examples of the photoreactive group include a group having a cinnamic acid (cinnamoyl) structure (skeleton), a group having a coumarin structure (skeleton), a group having a chalcone structure (skeleton), a group having a benzophenone structure (skeleton), and a group having an anthracene structure (skeleton). Among these groups, a group having a cinnamoyl structure or a group having a coumarin structure is preferable, and a group having a cinnamoyl structure is more preferable.

In addition, the photosensitive compound containing a photoreactive group may further contain a crosslinkable group.

As the crosslinkable group, a thermally crosslinkable group that causes a curing reaction due to the action of heat and a photocrosslinkable group that causes a curing reaction due to the action of light are preferable, and the crosslinkable group may be a crosslinkable group that contains both a thermally crosslinkable group and a photocrosslinkable group.

Examples of the crosslinkable group include at least one selected from the group consisting of an epoxy group, an oxetanyl group, a group represented by —NH—CH$_2$—O—R (R represents a hydrogen atom or an alkyl group having 1 to 20 carbon atoms), a group having an ethylenically unsaturated double bond, and a block isocyanate group. Among these, an epoxy group, an oxetanyl group, or a group having an ethylenically unsaturated double bond is preferable.

Further, a 3-membered cyclic ether group is also referred to as an epoxy group, and a 4-membered cyclic ether group is also referred to as an oxetanyl group.

Further, specific examples of the group having an ethylenically unsaturated double bond include a vinyl group, an allyl group, a styryl group, an acryloyl group, and a methacryloyl group. Among these, an acryloyl group or a methacryloyl group is preferable.

The photo-alignment film formed of the above-described material is irradiated with linearly polarized light or non-polarized light to produce a photo-alignment film.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic coloring agent polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter or a wavelength conversion element.

In a case where light to be applied is linearly polarized light, a method of applying light vertically or obliquely to the upper surface with respect to the alignment film or the surface of the alignment film from the rear surface is employed. The incidence angle of light varies depending on the photo-alignment material, but is preferably in a range of 0° to 90° (vertical) and preferably in a range of 40° to 90°.

In a case where light to be applied is non-polarized light, the alignment film is irradiated with non-polarized light obliquely. The incidence angle is preferably in a range of 10° to 80°, more preferably in a range of 20° to 60°, and still more preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

Specific Compound

The photo-alignment film of the optical laminate according to the embodiment of the present invention contains a specific compound having a refractive index of 1.55 to 1.70 as described above.

In the present specification, the values of Chemistry Handbook, Polymer Handbook (JOHN WILEY & SONS, INC), and various catalogs are employed as the value of the refractive index of the compound.

Further, a value measured using an Abbe refractive index meter (NAR-4T, manufactured by Atago Co., Ltd.) and a sodium lamp (λ=589 nm) as a light source is employed for a compound having a refractive index value that is unknown. Specifically, a refractive index obtained by solutionizing the compound in a good solvent having a known refractive index at a concentration of 10% by mass and performing calculation according to the following equation is employed. In the following equation, "$n_{compound}$" represents the refractive index of the compound to be calculated, "$n_{solution}$" represents the refractive index of the solution in which the compound is dissolved, and "$n_{good\ solvent}$" represents the refractive index of the good solvent in which the compound is dissolved.

$$n_{compound} = (n_{solution} - 0.9 \times n_{good\ solvent}) \times 10$$

In the present invention, from the viewpoint of further suppressing a change in tint of reflected light during black display in a case where the optical laminate is used for the image display device, the refractive index of the specific compound is more preferably in a range of 1.62 to 1.70.

In the present invention, from the viewpoint of further suppressing a change in tint of reflected light during black display in a case where the optical laminate is used for the image display device, the molecular weight of the specific compound is preferably 1,000 or less and is preferably in a range of 100 to 1,000. The reason for this is considered to be that the compatibility with the photo-alignment film is enhanced in a case where the molecular weight of the specific compound is 1,000 or less.

In the present invention, from the viewpoint that the compatibility with the photo-alignment film is high and a difference in refractive index between the specific compound and the base material is suppressed, the specific compound is preferably a compound represented by any of Formulae (1) to (3) and more preferably a compound represented by any of Formulae (1) and (2).

$$B-(G-A)n-G-B \quad (1)$$

Here, in Formula (1), n represents an integer of 0 or greater.

B represents an acyl group having at least one aromatic ring. Here, a plurality of B's may be the same as or different from each other.

G represents an alkylene glycol residue, an aryl glycol residue, or an oxyalkylene glycol residue. Here, in a case where n represents an integer of 1 or greater, a plurality of G's may be the same as or different from each other.

A represents an alkylene dicarboxylic acid residue or an aryl dicarboxylic acid residue, where in a case where n represents an integer of 2 or greater, a plurality of A's may be the same as or different from each other.

The compound represented by Formula (1) is preferably an ester-based compound obtained by reacting a carboxylic acid component having at least one aromatic ring with an alkylene glycol component, an aryl glycol component, or an oxyalkylene glycol component in a case where n represents 0 and more preferably an ester-based compound obtained by reacting a carboxylic acid component having at least one aromatic ring with an alkylene glycol component, an aryl glycol component, or an oxyalkylene glycol component, and an alkylene dicarboxylic acid component or an aryl dicarboxylic acid component in a case where n represents an integer of 1 or greater.

Here, examples of the aromatic ring of the carboxylic acid component having at least one aromatic ring include an aromatic hydrocarbon ring such as a benzene ring, a naphthalene ring, an anthracene ring, or a phenanthroline ring, and an aromatic heterocyclic ring such as a furan ring, a pyrrole ring, a thiophene ring, a pyridine ring, a thiazole ring, or a benzothiazole ring.

Examples of the carboxylic acid component having at least one aromatic ring include benzoic acid, para-tertiary butyl benzoic acid, orthotoluic acid, metatoluic acid, para-toluic acid, dimethyl benzoic acid, ethyl benzoic acid, normal propyl benzoic acid, aminobenzoic acid, and acetoxybenzoic acid, and these can be used alone or in the form of a mixture of two or more kinds thereof.

Examples of the alkylene glycol component include ethylene glycol, 1,2-propylene glycol, 1,3-propylene glycol, 1,2-butanediol, 1,3-butanediol, 1,2-propanediol, 2-methyl 1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3 propanediol (3,3-dimethylolheptane), 3-methyl-1,5-pentanediol 1,6-hexanediol, 2,2,4-trimethyl 1,3-pentanediol, 2-ethyl 1,3-hexanediol, 2-methyl 1,8-octanediol, 1,9-nonanediol, 1,10-decanediol, and 1,12-octadecanediol, and these glycols can be used alone or in the form of a mixture of two or more kinds thereof. Among these, alkylene glycol having 2 to 12 carbon atoms is preferable.

Examples of the aryl glycol component include hydroquinone, resorcinol, bisphenol A, bisphenol F, and bisphenol, and these glycols can be used alone or in the form of a mixture of two or more kinds thereof.

Examples of the oxyalkylene glycol component include diethylene glycol, triethylene glycol, tetraethylene glycol, dipropylene glycol, and tripropylene glycol, and these glycols can be used alone or in the form of a mixture of two or more kinds thereof.

Further, examples of the alkylenedicarboxylic acid component include succinic acid, maleic acid, fumaric acid, glutaric acid, adipic acid, azelaic acid, sebacic acid, and dodecanedicarboxylic acid, and these can be used alone or in the form of a mixture of two or more kinds thereof.

Further, examples of the arylenedicarboxylic acid component include phthalic acid, terephthalic acid, isophthalic acid, 1,5-naphthalenedicarboxylic acid, and 1,4-naphthalenedicarboxylic acid, and these can be used alone or in the form of a mixture of two or more kinds thereof.

In the present invention, from the viewpoint of suppressing reflected light during black display in a case where the optical laminate is used for the image display device, it is preferable that B in Formula (1) represents a group represented by Formula (4).

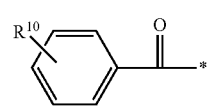

(4)

In Formula (4), * represents a bonding position.

Further, $R^{10}$ represents a hydrogen atom, an alkyl group which may have a substituent, a carboxy group, or a hydroxy group.

Here, as the alkyl group represented by an aspect of $R^{10}$, a linear, branched, or cyclic alkyl group having 1 to 18 carbon atoms is preferable, an alkyl group having 1 to 8 carbon atoms is more preferable, and examples thereof include a methyl group, an ethyl group, a propyl group, an isopropyl group, an n-butyl group, an isobutyl group, a sec-butyl group, a t-butyl group, and a cyclohexyl group.

In the present invention, from the viewpoint of suppressing occurrence of retardation in the photo-alignment film, it is preferable that A in Formula (1) represents a dicarboxylic acid residue represented by Formula (5).

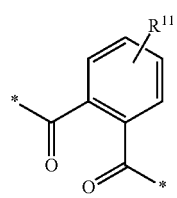

(5)

In Formula (5), * represents a bonding position.

Further, $R^{11}$ represents a hydrogen atom, an alkyl group which may have a substituent, a carboxy group, or a hydroxy group.

Here, examples of the alkyl group represented by an aspect of $R^{11}$ include the same groups as those for the alkyl group represented by an aspect of $R^{10}$ in Formula (4).

The number average molecular weight of the compound represented by Formula (1) is preferably in a range of 100 to 1,000.

Further, the acid value of the compound represented by Formula (1) is preferably 0.5 mgKOH/g or less and more preferably 0.3 mgKOH/g or less.

Further, the hydroxyl group value of the compound represented by Formula (1) is preferably 25 mgKOH/g or less and more preferably 15 mgKOH/g or less.

Specific examples of the compound represented by Formula (1) include the compounds shown below.

B-1

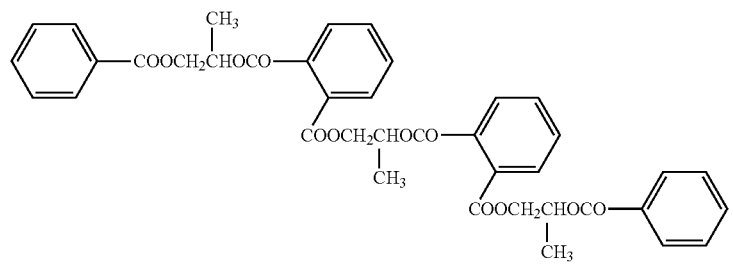

Mw: 696

B-2

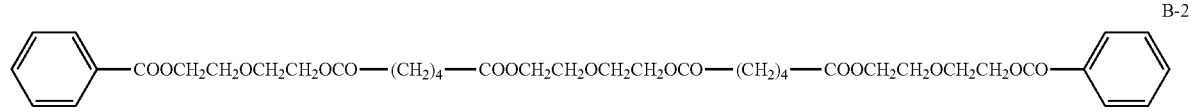

Mw: 746

B-3

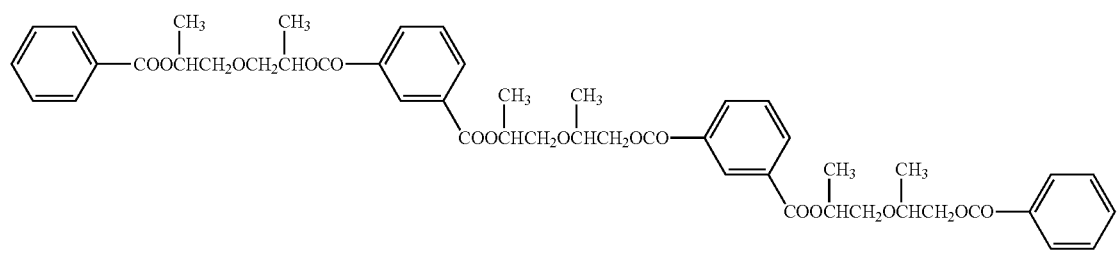

Mw: 830

B-4

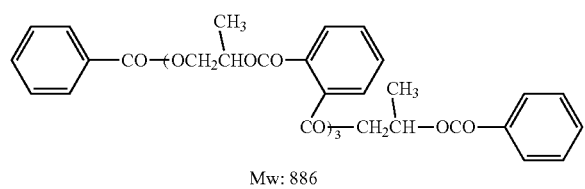

Mw: 886

B-5

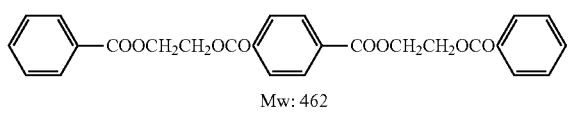

Mw: 462

-continued
B-6
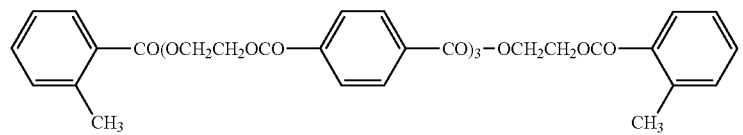
Mw: 874
B-7
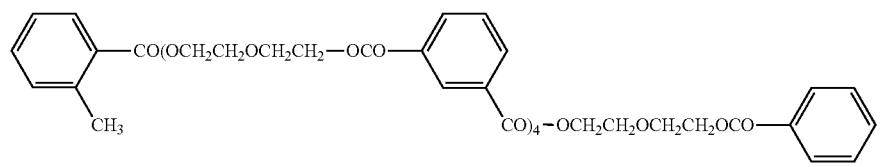
Mw: 1258
B-8
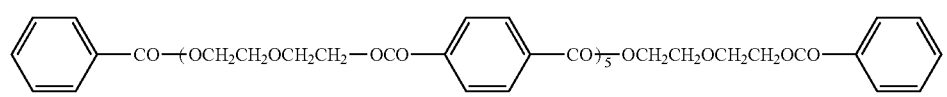
Mw: 1494
B-9
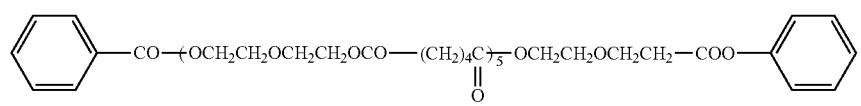
Mw: 1394
B-10
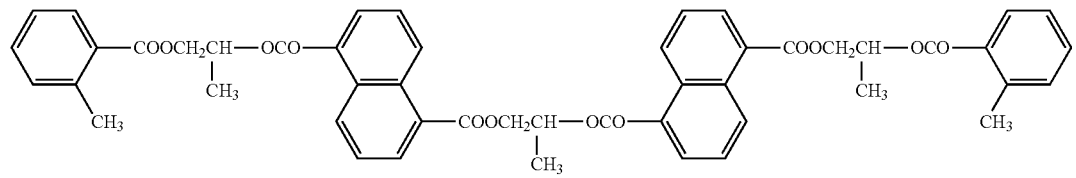
Mw: 852
B-11
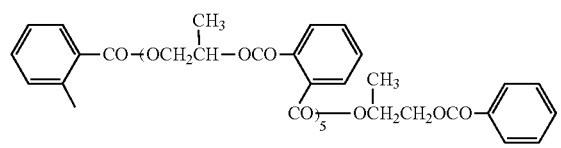
Mw: 1314
B-12
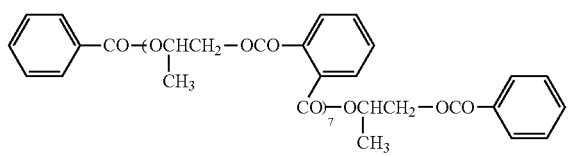
Mw: 1726
B-13
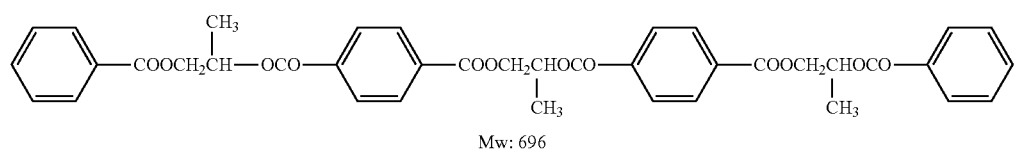
Mw: 696
B-14
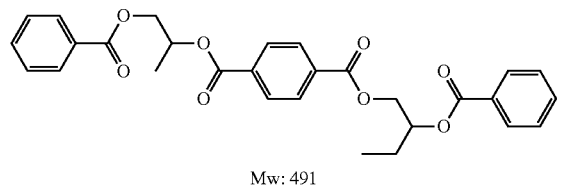
Mw: 491
B-15
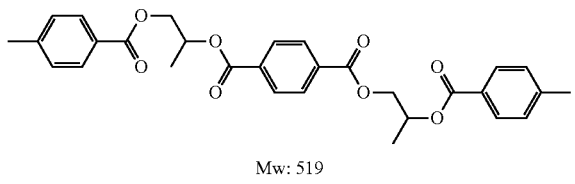
Mw: 519

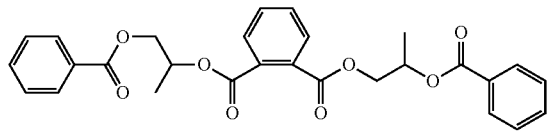

B-16

Mw: 491

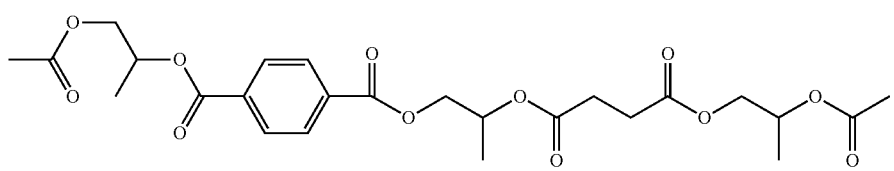

B-17

Mw: 510

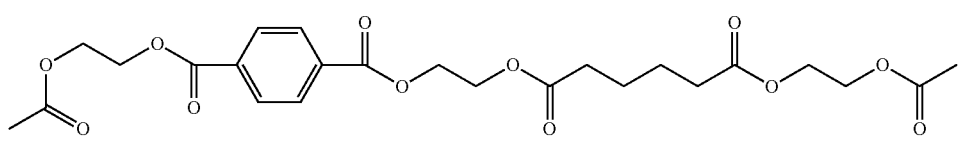

B-18

Mw: 525

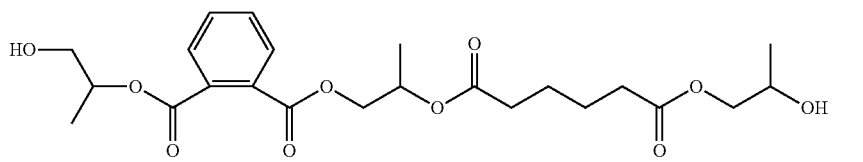

B-19

Mw: 437

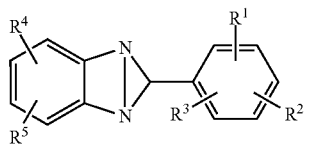

(2)

In Formula (2), $R^1$, $R^2$, $R^3$, $R^4$, and $R^5$ each independently represent a hydrogen atom, a halogen atom, a nitro group, a hydroxy group, an alkyl group which may have a substituent, an alkenyl group which may have a substituent, an aryl group which may have a substituent, an alkoxy group which may have a substituent, an acyloxy group which may have a substituent, an aryloxy group which may have a substituent, an alkylthio group which may have a substituent, an arylthio group which may have a substituent, a mono- or dialkylamino group which may have a substituent, an acylamino group which may have a substituent, or a 5- to 6-membered heterocyclic group. However, $R^4$ and $R^5$ may be bonded to each other to form a 5- to 6-membered carbon ring.

Examples of the halogen atom represented by an aspect of $R^1$, $R^2$, $R^3$, $R^4$, and $R^5$ include a fluorine atom, a chlorine atom, a bromine atom, and an iodine atom. Among these, a fluorine atom or a chlorine atom is preferable.

Further, as the alkyl group, a linear, branched, or cyclic alkyl group having 1 to 18 carbon atoms is preferable, an alkyl group having 1 to 8 carbon atoms is more preferable, and examples thereof include a methyl group, an ethyl group, a propyl group, an isopropyl group, an n-butyl group, an isobutyl group, a sec-butyl group, a t-butyl group, and a cyclohexyl group.

Further, as the alkenyl group, an alkenyl group having 2 to 18 carbon atoms is preferable, and examples thereof include a vinyl group, an allyl group, and a 3-butene-1-yl group.

Further, as the aryl group, an aryl group having 6 to 24 carbon atoms is preferable, and examples thereof include a phenyl group, a 2,6-diethylphenyl group, and a naphthyl group.

Further, as the alkoxy group, an alkoxy group having 1 to 18 carbon atoms is preferable, an alkoxy group having 1 to 8 carbon atoms is more preferable, and examples thereof include a methoxy group, an ethoxy group, an n-butoxy group, and a methoxyethoxy group.

Further, as the acyloxy group, an acyloxy group having 2 to 24 carbon atoms is preferable, and examples thereof include an acetoxy group, a pivaloyloxy group, a benzoyloxy group, and a dodecanoyloxy group.

Further, as the aryloxy group, an aryloxy group having 6 to 24 carbon atoms is preferable, and examples thereof include a phenoxy group and a 1-naphthoxy group.

Further, as the alkylthio group, an alkylthio group having 1 to 24 carbon atoms is preferable, and examples thereof include a methylthio group, an ethylthio group, an octylthio group, and a cyclohexylthio group.

Further, as the arylthio group, an arylthio group having 6 to 24 carbon atoms is preferable, and examples thereof include a phenylthio group.

Further, as the mono- or dialkylamino group, an alkylamino group having 1 to 18 carbon atoms is preferable, and examples thereof include methylamino, dimethylamino, diethylamino, dibutylamino, octylamino, dioctylamino, and undecylamino.

Further, examples of the acylamino group include a formylamino group, an alkylcarbonylamino group having 2 to 30 carbon atoms, and an arylcarbonylamino group having 6 to 30 carbon atoms.

Further, examples of the 5- to 6-membered heterocyclic group include a furan ring, a pyrrole ring, a thiophene ring, a pyridine ring, and a thiazole ring.

Specific examples of the compound represented by Formula (2) include 2-(2'-hydroxy-5'-methylphenyl)benzotriazole, 2-(2'-hydroxy-3',5')-di-tert-butylphenyl)benzotriazole, 2-(2'-hydroxy-3 '-tert-butyl-5'-methylphenyl)benzotriazole, 2-(2'-hydroxy-3',5'-di-tert-butylphenyl)-5-chlorobenzotriazole, 2-(2'-hydroxy-3 '-(3",4",5",6"-tetrahydrophthalimidomethyl)-5'-methylphenyl)benzotriazole, 2,2-methylenebis(4-(1,1,3,3-tetramethylbutyl)-6-(2H-benzotriazole-2-yl) phenol), 2-(2'-hydroxy-3'-tert)-butyl-5'-methylphenyl)-5-chlorobenzotriazole, 2-(2H-benzotriazole-2-yl)-6-(linear and side-chain dodecyl)-4-methylphenol, and a mixture of octyl-3-[3-tert-butyl-4-hydroxy-5-(chloro-2H-benzotriazole-2-yl)phenyl] propionate and 2-ethylhexyl-3-[3-tert-butyl-4-hydroxy-5-(5-chloro-2H-benzotriazole-2-yl)phenyl] propionate.

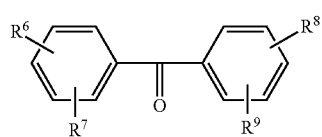

(3)

In Formula (3), $R^6$, $R^7$, $R^8$, and $R^9$ each independently represent a hydrogen atom, a halogen atom, a hydroxy group, an alkyl group which may have a substituent, an alkenyl group which may have a substituent, an alkoxy group which may have a substituent, a phenyl group which may have a substituent, a cycloalkyl group which may have a substituent, an alkylcarbonyl group which may have a substituent, an alkylsulfonyl group which may have a substituent, or a —CO(NH)$_{m-1}$-D group, D represents an alkyl group which may have a substituent, an alkenyl group which may have a substituent, or a phenyl group which may have a substituent, and m represents 1 or 2.

Examples of the halogen atom, the alkyl group, the alkenyl group, and the alkoxy group represented by an aspect of $R^6$, $R^7$, $R^8$, and $R^9$ include the same groups as those represented by an aspect of $R^1$, $R^2$, $R^3$, $R^4$, and $R^5$ in Formula (2).

Further, examples of the cycloalkane ring constituting a cycloalkyl group include a cyclohexane ring, a cycloheptane ring, a cyclooctane ring, a cyclododecane ring, and a cyclodocosane ring.

Further, examples of the alkylcarbonyl group include a methylcarbonyl group, an ethylcarbonyl group, an n-propylcarbonyl group, and an isopropylcarbonyl group.

Further, as the alkylsulfonyl group, an alkylsulfonyl group having 1 to 4 carbon atoms is preferable, and examples thereof include a trifluoromethylsulfonyl group and a methyl sulfonyl group.

Specific examples of the compound represented by Formula (3) include 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

The content of the specific compound contained in the photo-alignment film is not particularly limited, but is preferably in a range of 0.1 to 150 mg/cm$^3$, more preferably in a range of 0.5 to 100 mg/cm$^3$, and still more preferably in a range of 1 to 30 mg/cm$^3$ from the viewpoint of reducing a difference in refractive index between the base material and the photo-alignment film and a difference in refractive index between the photo-alignment film and the light absorption anisotropic layer and further suppressing occurrence of a change (coloration) in tint of reflected light during black display. Further, in a case where a plurality of specific compounds are used in combination, the above-described numerical ranges are the total amounts of the contents of the plurality of specific compounds.

Here, the content (mg/cm$^3$) of the specific compound can be acquired by taking out the photo-alignment film from the laminate and measuring a solution in which the photo-alignment film is dissolved, by HPLC. In a case where the photo-alignment film is difficult to take out, the content of the specific compound can also be calculated by subtracting the content of the specific compound contained in the base material and the light absorption anisotropic layer from the content of the specific compound contained in the laminate. Further, the quantification can be performed by using the specific compound contained in the photo-alignment film as a standard sample. Further, the presence or absence of the specific compound can also be determined not only by HPLC but also by mass spectrometryor the like.

Further, the region of the photo-alignment film in the optical laminate can also be measured by detecting another one layer between the base material and the light absorption anisotropic layer by cross-sectional observation using TOF-SIMS.

Base Material

The base material of the optical laminate according to the embodiment of the present invention is a base material having a glass transition temperature of 150° C. or higher.

In the present specification, the glass transition temperature of the base material (hereinafter, also abbreviated as "Tg") denotes a temperature at which tan δ shows a peak in a case where the dynamic viscoelastic tan δ of the base material is measured.

In the present invention, the Tg of the base material is preferably higher than 170° C. and more preferably in a range of 175° C. to 230° C. from the viewpoint of further enhancing the uniformity of the optical laminate and further suppressing a change in tint of reflected light during black display in a case where the optical laminate is used for the image display device.

The base material is not particularly limited as long as the Tg is 150° C. or higher, and a known base material can be used. In particular, a transparent base material is preferable as the base material. Further, the transparent base material denotes a base material in which the transmittance of visible light is 60% or greater, and the transmittance is preferably 80% or greater and more preferably 90% or greater.

Examples of such a base material include a glass substrate and a polymer film.

Examples of the material of the polymer film include a cellulose-based polymer, a cycloolefin-based polymer, a polyester-based polymer, an olefin-based polymer, a (meth) acrylic polymer, and a polyamide-based polymer.

Among these, a polymer film formed of a cellulose-based polymer and particularly a cellulose acylate-based polymer (cellulose acylate-based film) or a polymer film formed of a cycloolefin-based polymer and particularly a polymer having an alicyclic structure is preferable, and a cellulose acylate-based film is more preferable.

In the present invention, from the viewpoint of further suppressing a change in tint of reflected light during black display in a case where the optical laminate is used for the image display device, it is preferable that the base material is a base material consisting of a cellulose acylate-based film which satisfies at least one of Condition 1 or Condition 2. In addition, in a case where the cellulose acylate-based film contains both a compound represented by Formula (2) and a compound represented by Formula (3), the content in Condition 2 (0.1% to 10% by mass) denotes the content of the total content of both compounds.

Condition 1: the cellulose acylate-based film contains 1% to 20% by mass of a compound represented by Formula (1)

Condition 2: the cellulose acylate-based film contains 0.1% to 10% by mass of a compound represented by Formula (2) or (3)

Further, in the present invention, from the viewpoint of suppressing reflected light during black display in a case where the optical laminate is used for the image display device, a distribution of the content of at least one of sodium ions or potassium ions (hereinafter, also referred to as "alkali metal ions") contained in the base material in the thickness direction is preferably a distribution in which the content in a surface layer portion corresponding to 1% of the thickness from a surface of the base material on a side of the photo-alignment film is three or more times the content in a central portion of the base material in the thickness direction and more preferably a distribution in which the content thereof is 5 or more times the content in a central portion of the base material in the thickness direction.

Here, the distribution of the content of the alkali metal ions contained in the base material in the thickness direction denotes the distribution in a case of measurement using the following definitions and methods.

First, in a case where an interface of the base material on a side of the photo-alignment film is defined as a first surface and a surface of the base material on a side opposite to the photo-alignment film is defined as a second surface, in the profile of the secondary ion intensity derived from the base material in the thickness direction, which is obtained by analyzing the component in the thickness direction using TOF-SIMS while the base material is irradiated with ion beams from the first surface toward the second surface of the base material, the thickness of the base material between a position A and a position C is defined as d in a case where the position closest to the first surface is defined as the position A and the position closest to the second surface is defined as the position C among positions where the secondary ion intensity is 20% of the maximum value of the secondary ion intensity derived from the base material.

Next, in a case where the position that internally divides the position A and the position C into a ratio of 1:1 (that is, the central portion in the thickness) is defined as the position B, and the position that internally divides the position A and the position C into a ratio of 1:99 is defined as the position A' (that is, the surface layer portion corresponding to 1% of the thickness from the surface on the side of the photo-alignment film), the secondary ion intensity derived from alkali metal ions at the position A1 is compared with the secondary ion intensity at the position B.

Further, the TOF-SIMS method is specifically described in "Surface Analysis Technology Selections, Secondary Ion Mass Spectrometry", edited by Journal of the Surface Science Society of Japan (Maruzen Co., Ltd., published in 1999).

In a case where a component of a specific optical film in a depth direction is analyzed by TOF-SIMS while the film is irradiated with ion beams, a series of operations of performing component analysis on a surface depth region of 1 to 2 nm, entering from 1 nm to several hundreds of nanometers in the depth direction, and performing component analysis of a next surface depth region of 1 to 2 nm are repeated.

Optically Anisotropic Layer

It is preferable that the optical laminate according to the embodiment of the present invention includes an optically anisotropic layer.

Here, the optically anisotropic layer denotes all films showing a retardation, and examples thereof include a stretched polymer film and a retardation film provided with an optically anisotropic layer containing a liquid crystal compound aligned on a support.

Here, the alignment direction of the liquid crystal compound contained in the optically anisotropic layer is not particularly limited, and examples thereof include horizontal, vertical, and twisted alignment with respect to the film surface.

Further, a $\lambda/4$ plate, a $\lambda/2$ plate, and the like have specific functions of the optically anisotropic layer.

In addition, the optically anisotropic layer may be formed of a plurality of layers. In regard to the optically anisotropic layer formed of a plurality of optically anisotropic layers, for example, the description in paragraphs [0008] to [0053] of JP2014-209219A can be referred to.

Further, such an optically anisotropic layer and the above-described light absorption anisotropic layer may be provided by coming into contact with each other, or another layer may be provided between the optically anisotropic film and the light absorption anisotropic film. Examples of such a layer include a pressure sensitive adhesive layer or an adhesive layer for ensuring the adhesiveness.

It is preferable that the optical laminate according to the embodiment of the present invention has a $\lambda/4$ plate as the above-described optically anisotropic layer. Specific suitable examples of an aspect that the optical laminate has a $\lambda/4$ plate include an aspect that the $\lambda/4$ plate is provided on a side of the above-described light absorption anisotropic layer opposite to the photo-alignment film, that is, an aspect that the above-described base material, the photo-alignment film, the light absorption anisotropic layer, and the $\lambda/4$ plate are provided in this order and an aspect that a laminate obtained by peeling off the base material from the optical laminate according to the embodiment of the present invention and the $\lambda/4$ plate provided on the photo-alignment film in the laminate are provided, that is, an aspect that the light absorption anisotropic layer, the photo-alignment film, and the $\lambda/4$ plate are provided in this order.

Here, "$\lambda/4$ plate" is a plate having a $\lambda/4$ function, specifically, a plate having a function of converting linearly polarized light having a specific wavelength into circularly polarized light (or converting circularly polarized light into linearly polarized light).

For example, specific examples of an aspect in which a $\lambda/4$ plate has a single-layer structure include a stretched polymer film and a retardation film in which an optically anisotropic layer having a $\lambda/4$ function is provided on a support. Further, specific examples of an aspect in which a $\lambda/4$ plate has a multilayer structure include a broadband $\lambda/4$ plate obtained by laminating a $\lambda/4$ plate and a $\lambda/2$ plate.

Barrier Layer

The optical laminate according to the embodiment of the present invention may have a barrier layer.

Here, the barrier layer is also referred to as a gas barrier layer (oxygen blocking layer) and has a function of protecting the polarizer of the present invention from gas such as oxygen in the atmosphere, the moisture, or the compound contained in an adjacent layer.

In regard to the barrier layer, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.

Pressure Sensitive Adhesive Layer

The optical laminate according to the embodiment of the present invention may include a pressure sensitive adhesive layer on a surface to which the $\lambda/4$ plate is bonded, from the viewpoint of bonding the $\lambda/4$ plate described above.

Examples of the pressure sensitive adhesive contained in the pressure sensitive adhesive layer include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, a polyvinylpyrrolidone-based pressure sensitive adhesive, a polyacrylamide-based pressure sensitive adhesive, and a cellulose-based pressure sensitive adhesive.

Among these, an acrylic pressure sensitive adhesive (pressure sensitive adhesive) is preferable from the viewpoints of the transparency, the weather fastness, the heat resistance, and the like.

The pressure sensitive adhesive layer can be formed by a method of coating a release sheet with a solution of a pressure sensitive adhesive, drying the solution, and transferring the sheet to a surface of a transparent resin layer or a method of directly coating a surface of a transparent resin layer with a solution of a pressure sensitive adhesive and drying the solution.

A solution of a pressure sensitive adhesive is prepared as a 10 to 40 mass % solution obtained by dissolving or dispersing the pressure sensitive adhesive in a solvent such as toluene or ethyl acetate.

As a coating method, a roll coating method such as reverse coating or gravure coating, a spin coating method, a screen coating method, a fountain coating method, a dipping method, or a spraying method can be employed.

Examples of the constituent material of the release sheet include appropriate thin paper bodies, for example, synthetic resin films such as polyethylene, polypropylene, and polyethylene terephthalate, rubber sheets, paper, cloth, nonwoven fabrics, nets, foam sheets, and metal foils.

In the present invention, the thickness of an optional pressure sensitive adhesive layer is not particularly limited, but is preferably in a range of 3 µm to 50 µm, more preferably in a range of 4 µm to 40 µm, and still more preferably in a range of 5 µm to 30 µm.

Applications

The optical laminate according to the embodiment of the present invention can be used as a polarizer (polarizing plate) and specifically, the optical laminate can be used as, for example, as a linearly polarizing plate or a circularly polarizing plate.

In a case where the optical laminate according to the embodiment of the present invention does not include an optically anisotropic layer such as the $\lambda/4$ plate, the laminate can be used as a linearly polarizing plate.

Meanwhile, in a case where the optical laminate according to the embodiment of the present invention includes the $\lambda/4$ plate, the laminate can be used as a circularly polarizing plate.

Image Display Device

An image display device according to the embodiment of the present invention includes the above-described optical laminate according to the embodiment of the present invention (particularly, the aspect that the optical laminate includes a $\lambda/4$ plate).

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, in the image display device according to the embodiment of the present invention, a liquid crystal display device formed of a liquid crystal cell as a display element or an organic EL display device formed of an organic EL display panel as a display element is preferable, and a liquid crystal display device is more preferable.

Liquid Crystal Display Device

A liquid crystal display device which is an example of the image display device according to the embodiment of the present invention is a liquid crystal display device that includes the above-described optical laminate according to the embodiment of the present invention (but does not include a $\lambda/4$ plate) and a liquid crystal cell.

In the present invention, between the laminates provided on both sides of the liquid crystal cell, it is preferable that the optical laminate according to the embodiment of the present invention is used as a front-side polarizer and more preferable that the optical laminate according to the embodiment of the present invention is used as a front-side polarizer and a rear-side polarizer.

Hereinafter, the liquid crystal cell constituting the liquid crystal display device will be described in detail.

Liquid Crystal Cell

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules (rod-like liquid crystal compound) are substantially horizontally aligned in a case of no voltage application and further twistedly aligned at 60° to 120°. The liquid crystal cell in a TN mode is most frequently used as a color TFT liquid crystal display device and is described in a plurality of documents.

In the liquid crystal cell in a VA mode, rod-like liquid crystal molecules are substantially vertically aligned at the time of no voltage application. The concept of the liquid crystal cell in a VA mode includes (1) liquid crystal cell in a VA mode in a narrow sense where rod-like liquid crystal molecules are aligned substantially vertically in a case of no voltage application and substantially horizontally in a case of voltage application (described in JP1990-176625A (JP-H2-176625A)), (2) liquid crystal cell (in a multi-domain vertical alignment (MVA) mode) (SID97, described in Digest of tech. Papers (proceedings) 28 (1997) 845) in which the VA mode is formed to have multi-domain in order to expand the viewing angle, (3) liquid crystal cell in an axially symmetric aligned microcell (n-ASM) mode in which rod-like liquid crystal molecules are substantially vertically aligned in a case of no voltage application and twistedly multi-domain aligned in a case of voltage application (described in proceedings of Japanese Liquid Crystal Conference, pp. 58 to 59 (1998)), and (4) liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of improving the viewing angle by reducing leakage light during black display in an oblique direction using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

Organic EL Display Device

As an organic EL display device which is an example of the image display device according to the embodiment of the present invention, an aspect of a display device including the above-described optical laminate (here, including a pressure sensitive adhesive layer and a λ/4 plate) according to the embodiment of the present invention and an organic EL display panel in order from the viewing side is suitably exemplified. In this case, the optical laminate is formed such that the base material, the photo-alignment film, the light absorption anisotropic layer, the pressure sensitive adhesive layer, and the λ/4 plate are disposed in order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

Preparation of Base Film 1

The following dope composition 1 was put into a closed container and completely dissolved while being held warm and stirred at 80° C. under pressure. Further, AEROSIL R972V (manufactured by Nippon Aerosil Co., Ltd.) was mixed with a part of ethanol added in advance and dispersed, and the solution was put into the closed container. The solution was cooled to a casting temperature, allowed to stand, subjected to a defoaming operation, and filtered through Azumi Filter Paper No. 244 (manufactured by Azumi Filter Paper Co., Ltd.), thereby obtaining a dope 1.

| Dope Composition 1 | |
| --- | --- |
| Cellulose triacetate (degree of substitution: 2.92) synthesized from cotton linter: | 70 kg |
| Cellulose triacetate (degree of substitution: 2.92) synthesized from wood pulp: | 30 kg |
| Compound 1 shown below: | 3.0 kg |
| Compound 2 shown below: | 1.5 kg |
| Compound 3 shown below: | 1.5 kg |
| Compound 4 shown below: | 1.5 kg |
| Compound 5 shown below: | 1.5 kg |
| AEROSIL R972V (manufactured by Nippon Aerosil Co., Ltd.): | 0.2 kg |
| Methylene chloride: | 391 kg |
| Ethanol: | 34 kg |

Compound 1

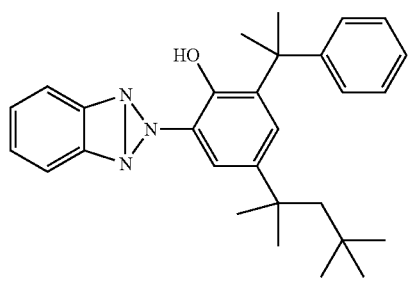

(refractive index: 1.65)

Compound 2

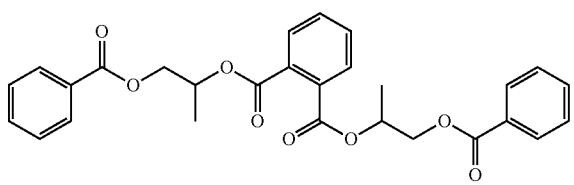

(refractive index: 1.58)

Compound 3

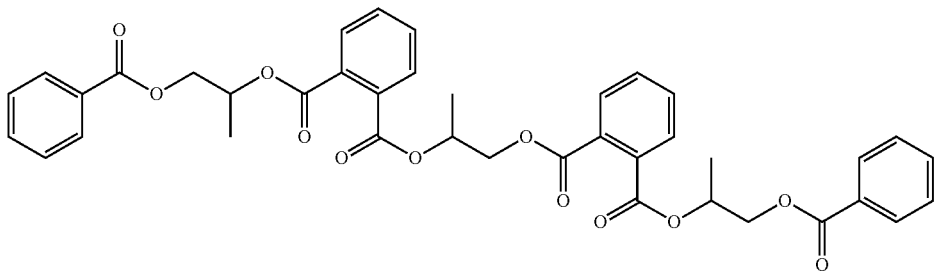

(refractive index: 1.59)

Compound 4

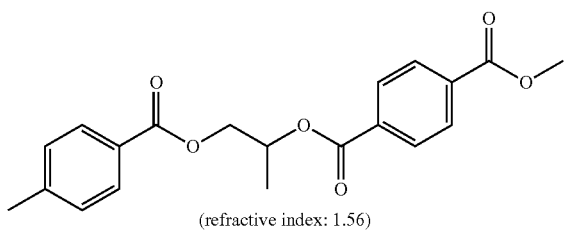

(refractive index: 1.56)

Compound 5

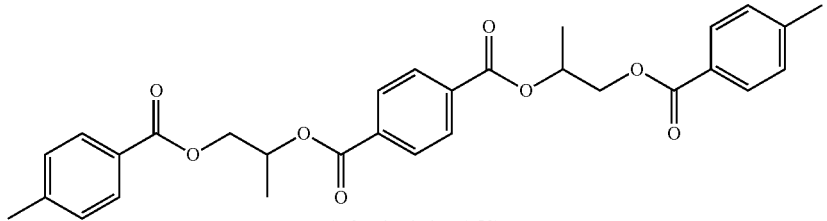

(refractive index: 1.58)

The dope 1 whose temperature was adjusted to 30° C. was uniformly cast on an endless stainless steel belt (support) heated with hot air at 30° C. (T2) from the rear surface. Immediately after the casting, the dope film (web) on the belt was dried by applying hot air at 25° C. (T1) thereto and heated from the rear surface of the belt with hot air at 55° C. (T4) 45 seconds after the casting, the web surface was dried by applying hot air at 55° C. (T3) thereto, and the film was peeled off at a peeling tension of 180 N/m 90 seconds after the casting and dried while being transported by a plurality of rolls at a transport tension of 150 N/m. The temperature of the endless stainless steel belt at the peeled portion was set to 12° C. The residual solvent amount during the peeling was 26% by mass. In addition, the web being dried on the support was sampled to acquire the elapsed time and the residual solvent amount after the casting, and as a result, the web was dried up to a residual solvent amount of 200 mass 18 seconds after the casting. The peeled film was dried by being transported through a first drying zone set at 50° C. for 1 minute, transported through a second drying zone set at 90° C. for 30 seconds, and transported through a third drying zone set at 115° C. for 10 minutes. The film was wound into a roll after being dried, thereby obtaining a cellulose ester film 1 (base film 1) having a winding length of 2,000 m and a film thickness of 25 The residual solvent amount during the winding was 0.1%.

Preparation of Base Film 2

Pellets of a mixture of 90 parts by mass of a (meth)acrylic resin having a lactone ring structure represented by Formula (1) {mass ratio of copolymerization monomers=methyl methacrylate/methyl 2-(hydroxymethyl) acrylate=8/2, lactone cyclization rate: approximately 100%, content ratio of lactone ring structure: 19.4%, mass average molecular weight: 133,000, melt flow rate: 6.5 g/10 min (240° C., 10 kgf (98.1 N))} and 10 parts by mass of an acrylonitrile-styrene (AS) resin {TOW AS AS20, manufactured by Toyo Styrene Co., Ltd.} were supplied to a biaxial extruder and melt-extruded into a sheet shape at approximately 280° C., thereby obtaining a (meth)acrylic resin sheet having a lactone ring structure with a thickness of 80 This unstretched sheet was stretched 1.5 times in length and 1.8 times in width under a temperature condition of 160° C., thereby obtaining a (meth)acrylic resin film (base film 2) (thickness: 40 in-plane retardation Re: 0.8 nm, thickness direction retardation Rth: 1.5 nm).

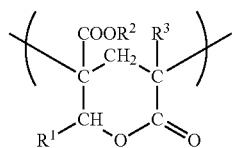

(1)

($R^1$ represents a hydrogen atom, and $R^2$ and $R^3$ represent a methyl group.)

Preparation of Base Film 3

An Arton film (base film 3) having a thickness of 40 μm was prepared by using Arton G7810 (manufactured by JSR Corporation). The Tg was 170° C.

Preparation of Base Film 4

The following composition was put into a mixing tank, stirred, and further heated at 90° C. for 10 minutes. Thereafter, the obtained composition was filtered through filter paper having an average pore size of 34 μm and a sintered metal filter having an average pore size of 10 μm, thereby preparing a dope. The concentration of solid contents of the dope was 23.5% by mass, the addition amount of the plasticizer was the ratio to the cellulose acylate, and the solvent of the dope was methylene chloride/methanol/butanol=81/18/1 (mass ratio).

| Cellulose acylate dope | |
|---|---|
| Cellulose acylate (acetyl substitution degree of 2.86, viscosity average polymerization degree of 310): | 100 parts by mass |
| Sugar ester compound 1 (Formula (S4)): | 6.0 parts by mass |
| Sugar ester compound 2 (Formula (S5)): | 2.0 parts by mass |
| Silica particle dispersion liquid (AEROSIL R972, manufactured by Nippon Aerosil Co., Ltd.): | 0.1 parts by mass |
| Solvent (methylene chloride/methanol/butanol): | 351.9 parts by mass |

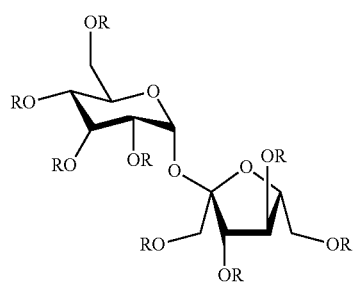

(S4)

(R = benzoyl or H Average substitution degree: 5.7)

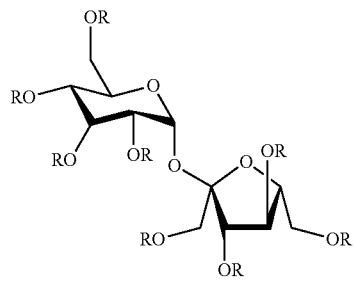

(S5)

(R = acetyl/isobutyryl = 2/6)

The dope prepared above was cast using a drum film forming machine. The dope was cast from a die such that the dope was in contact with the metal support cooled to 0° C., and the obtained web (film) was peeled off a drum. Further, the drum was made of stainless steel (SUS).

The web (film) obtained by casting was peeled off from the drum and dried in a tenter device for 20 minutes using a tenter device such that both ends of the web were clipped with clips and transported at 30° C. to 40° C. during film transport. Subsequently, the web was post-dried by zone heating while being transported using a roll. The obtained web was subjected to knurling and wound up to obtain a cellulose acylate film 4 (base film 4).

The film thickness of the obtained cellulose acylate film 4 was 60 μm, the in-plane retardation Re (550) at a wavelength of 550 nm was 1 nm, and the retardation Rth (550) at a wavelength of 550 nm in the thickness direction was 35 nm.

Example 1

Formation of Photo-Alignment Film 0.001 parts by mass of the above-described compound 1 was mixed into a solution obtained by dissolving 2 parts by mass of a photo-alignment polymer represented by the following formula in 98 parts by mass of o-xylene, thereby preparing a composition for forming a photo-alignment film.

Next, the base film 1 was coated with the composition for forming a photo-alignment film by a bar coating method and dried at 120° C. to obtain a dry coating film. The dry coating film was irradiated with polarized UV, thereby obtaining a photo-alignment film PA1. The polarized UV treatment was performed using a UV irradiation device (SPOT CURE SP-7; manufactured by Ushio Inc.) under the condition that the intensity measured at a wavelength of 365 nm was 100 mJ. The thickness of the photo-alignment film measured by a SEM was 0.3 μm.

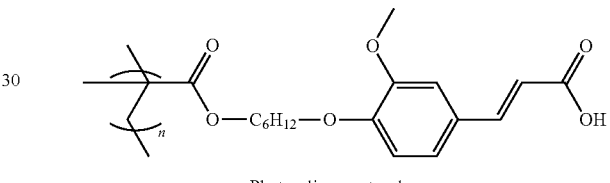

Photo-alignment polymer

Formation of Light Absorption Anisotropic Layer

The following components were mixed and stirred at 80° C. for 1 hour, thereby obtaining a composition 1 for forming a light absorption anisotropic layer.

| Composition 1 for forming light absorption anisotropic layer | |
|---|---|
| Polymerizable liquid crystal compound (1-6) shown below: | 75 parts by mass |
| Polymerizable liquid crystal compound (1-7) shown below: | 25 parts by mass |
| Dichroic substance A1 shown below: | 3 parts by mass |
| Dichroic substance A2 shown below: | 3 parts by mass |
| Dichroic substance A3 shown below: | 1 part by mass |
| Dichroic substance A4 shown below: | 1 part by mass |
| 2-Dimethylamino-2-benzyl-1-(4-morpholinophenyl)butan-1-one (IRGACURE 369, manufactured by BASF SE): | 6 parts |
| Polyacrylate compound (BYK-361N, manufactured by BYK-Chemie GmbH): | 1.2 parts |
| o-Xylene: | 250 parts |

Among these dichroic substances, the dichroic substance A3 and the dichroic substance A4 are dichroic substances having a maximal absorption wavelength in a wavelength range of 550 to 700 nm.

Polymerizable liquid crystal compound (1-6)

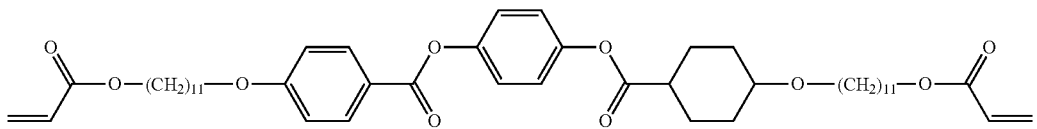

Polymerizable liquid crystal compound (1-7)

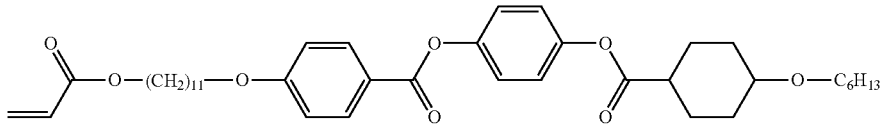

Dichroic substance A1

Dichroic substance A2

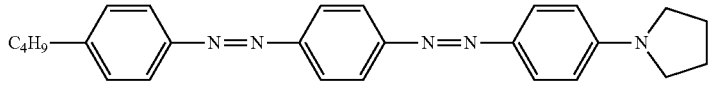

Dichroic substance A3

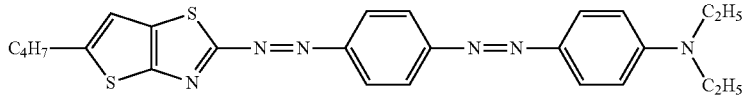

Dichroic substance A4

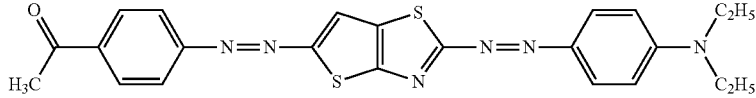

Next, the photo-alignment film PA1 was coated with the composition 1 for forming a light absorption anisotropic layer using a slot die coater to form a coating film. Further, the film was transported through a ventilation drying furnace set to 110° C. for 2 minutes so that the solvent was removed, and the film was rapidly cooled to obtain a dry coating film. Thereafter, the dry coating film was irradiated with ultraviolet light at 1,000 mJ/cm$^2$ (365 nm as a reference) using a high-pressure mercury lamp so that the polymerizable liquid crystal contained in the dry coating film was cured, to form a light absorption anisotropic layer P1, thereby preparing an optical laminate 1.

Example 2

An optical laminate 2 was prepared by the same method as in Example 1 except that the blending amount of the compound 1 used to form the photo-alignment film was changed from 0.001 parts by mass to 0.007 parts by mass.

Examples 3 to 6

The optical laminates 3 to 6 were prepared by the same method as in Example 2 except that the specific compounds (the compounds 2 to 5) listed in Table 1 were used in place of the compound 1 used to form the photo-alignment film.

Example 7

An optical laminate 7 was prepared by the same method as in Example 1 except that the base film 1 before the formation of the photo-alignment film PA1 was subjected to an alkali treatment with a 2.5 mol/1 sodium hydroxide aqueous solution at 40° C. for 60 seconds, washed with water for 3 minutes, and subjected to an alkali treatment.

Further, with the optical laminate 7, a distribution of the content of alkali metal ions contained in the base material in the thickness direction was confirmed by the above-described TOF-SIMS method, and as a result, the distribution was a distribution in which the content in the surface layer portion corresponding to 1% of the thickness from the surface of the base film 1 on a side of the photo-alignment film PA1 was eight or more times the content in the central portion of the base film 1 in the thickness direction.

Example 8

An optical laminate 8 was prepared by the same method as in Example 2 except that the base film 3 was used in place of the base film 1.

Example 9

An optical laminate 9 was prepared by the same method as in Example 2 except that the base film 4 was used in place of the base film 1.

Examples 10 and 11

Optical laminates 10 and 11 were prepared by the same method as in Example 2 except that the specific compounds (compounds 6 and 7 shown below) listed in Table 1 were used in place of the compounds 1 used to form the photo-alignment film.

Compound 6

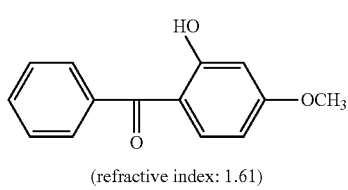

(refractive index: 1.61)

Compound 7

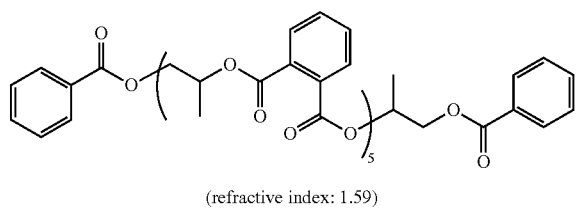

(refractive index: 1.59)

Example 12

An optical laminate 12 was prepared by the same method as in Example 2 except that the blending amount of the dichroic substance A3 used to form the light absorption anisotropic layer was set to 2 parts by mass and the dichroic substance A4 was not blended.

Example 13

An optical laminate 13 was prepared by the same method as in Example 2 except that the light absorption anisotropic layer was formed by the following method.
Formation of Light Absorption Anisotropic Layer The photo-alignment film PA1 was continuously coated with a composition for forming a light absorption anisotropic layer with the following composition with a wire bar, to form a coating film.

Next, the coating film was heated at 140° C. for 15 seconds, subjected to a heat treatment at 80° C. for 5 seconds, and rapidly cooled to room temperature (23° C.). Next, the coating film was heated at 75° C. for 60 seconds and cooled to room temperature again.

Thereafter, a light absorption anisotropic layer P3 (polarizer, thickness: 1.8 μm) was prepared on the photo-alignment film PA1 by irradiating the coating film with a light emitting diode (LED) lamp (center wavelength of 365 nm) for 2 seconds under an irradiation condition of an illuminance of 200 mW/cm$^2$.

The transmittance of the light absorption anisotropic layer P3 in a wavelength range of 280 to 780 nm was measured with a spectrophotometer, and the average transmittance of visible light was 42%.

The absorption axis of the light absorption anisotropic layer was in the plane of the light absorption anisotropic layer P3 and was orthogonal to the width direction of the cellulose acylate film.

| Composition of composition for forming light absorption anisotropic layer | |
|---|---|
| Dichroic substance Dye-C1 shown below: | 0.38 parts by mass |
| Dichroic substance Dye-C2 shown below: | 0.38 parts by mass |
| Dichroic substance Dye-M1 shown below: | 0.18 parts by mass |
| Dichroic substance Dye-Y1 shown below: | 0.55 parts by mass |
| Liquid crystal compound L-1 shown below: | 2.69 parts by mass |
| Liquid crystal compound L-2 shown below: | 1.15 parts by mass |
| Polymerization initiator IRGACURE OXE-02 (manufactured by BASF SE): | 0.17 parts by mass |
| Surfactant F-1 shown below: | 0.013 parts by mass |
| Cyclopentanone: | 92.14 parts by mass |
| Benzyl alcohol: | 2.36 parts by mass |

Further, among these dichroic substances, Dye-C1 and Dye-C2 are dichroic substances having a maximal absorption wavelength in a wavelength range of 550 to 700 nm.

Dichroic substance Dye-C1

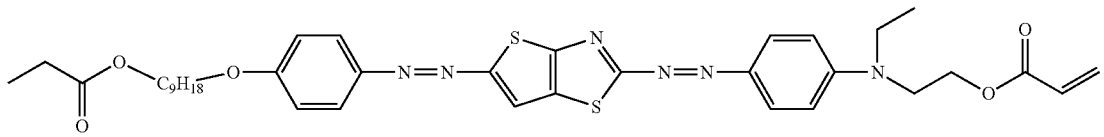

Dichroic substance Dye-C2

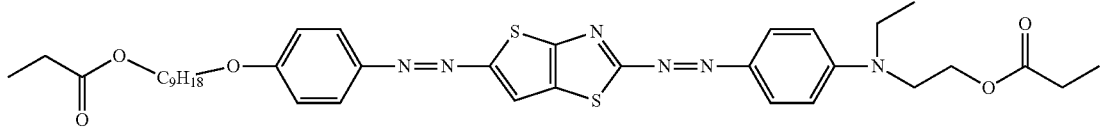

Dichroic substance Dye-M1

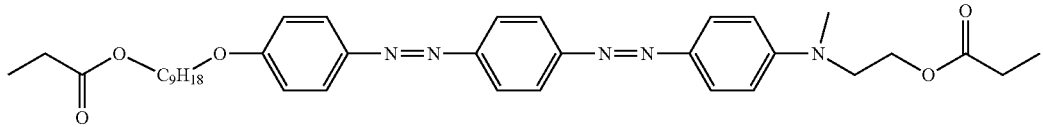

-continued

Dichroic substance Dye-Y1

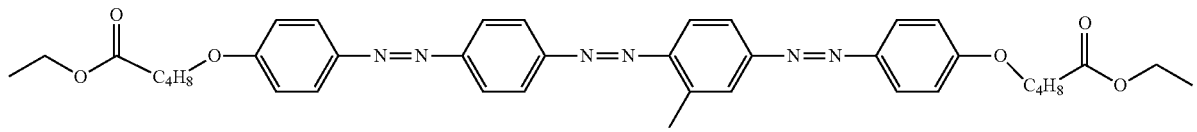

Liquid crystal compound L-1 (in the formulae, the numerical values ("59", "15", and "26") described in each repeating unit represent the content (% by mass) of each repeating unit with respect to all repeating units)

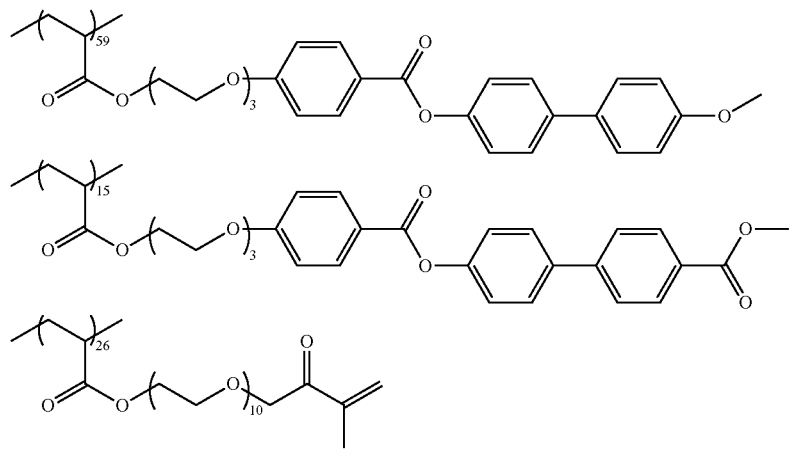

Liquid crystal compound L-2

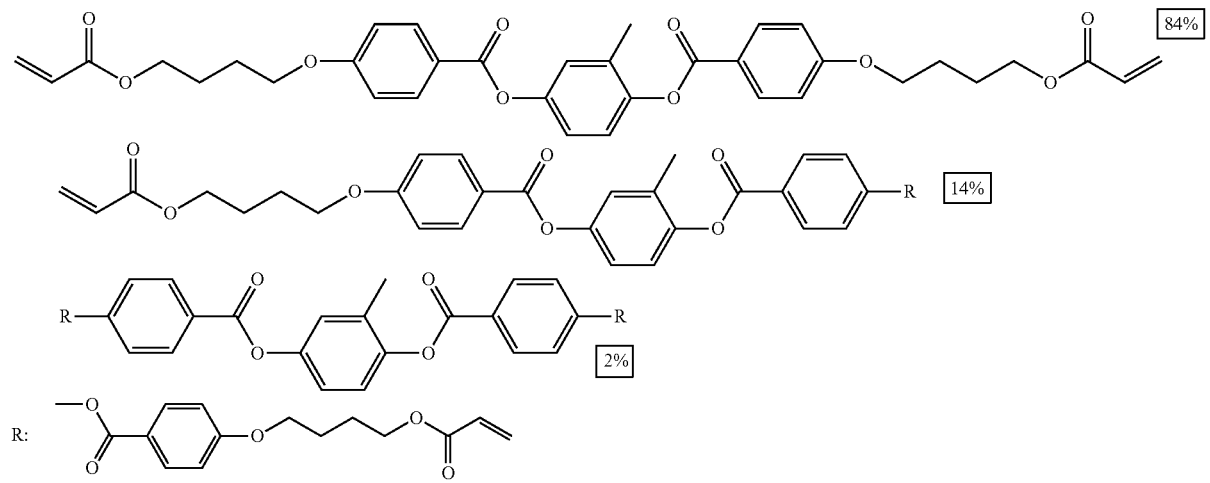

Surfactant F-1 (in the formulae, the numerical values described in each repeating unit represent the content (% by mass) of each repeating unit with respect to all repeating units, and Ac denotes —C(O)CH$_3$)

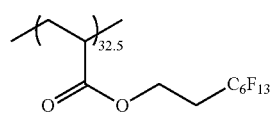

-continued

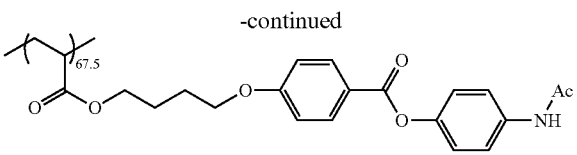

Evaluation

Change in Tint of Reflected Light During Black Display

GALAXY S5 (manufactured by Samsung Electronics Co., Ltd.) equipped with an organic EL panel (organic EL display element) was disassembled, the touch panel provided with a circularly polarizing plate was peeled off from the organic EL display device, the circularly polarizing plate was further peeled off from the touch panel, and the organic EL display element, the touch panel, and the circularly polarizing plate were isolated from each other. Subsequently, the isolated touch panel was bonded to the organic EL display element again, and the laminate prepared above was further bonded onto the touch panel such that air did not enter, thereby preparing an organic EL display device.

The visibility and display quality of the prepared organic EL display device were evaluated under bright light. The display screen of the display device was set to be displayed in black, and reflected light in a case of projecting fluorescent light on the front surface at a polar angle of 45 degrees was observed. The display performance was evaluated based on the following standards. The evaluation results are listed in Table 1. The evaluation result of D or higher is a practically acceptable level.

Evaluation Standards
- A: The screen was displayed in black and coloration was not visually recognized.
- B: The reflectivity was extremely low, and coloration was not almost visually recognized.
- C: The reflectivity was low, and coloration was slightly visually recognized.
- D: The reflectivity was low, and coloration was visually recognized, but was in an acceptable level.
- E: The reflectivity was high, and coloration was clearly visually recognized.

Uniformity

The change in tint of reflected light during black display was evaluated, and 20 organic EL display devices were further prepared with the optical laminates used in the organic EL display devices, which were evaluated as A to D, and the visibility and the display quality under bright light were evaluated. The display screen of the display device was set to be displayed in black, and reflected light in a case of projecting fluorescent light on the front surface at a polar angle of 45 degrees was observed. The display performance was evaluated based on the following standards. The evaluation results are described below. The evaluation result of d or higher is a practically acceptable level.

Evaluation Standards
- a: The number of display devices with the same reflectivity and the same coloration was in a range of 18 to 20, and all devices were evaluated as a D level or higher.
- b: The number of display devices with the same reflectivity and the same coloration was in a range of 15 to 17, and all devices were evaluated as a D level or higher.
- c: The number of display devices with the same reflectivity and the same coloration was in a range of 12 to 14, and all devices were evaluated as a D level or higher.
- d: The number of display devices with the same reflectivity and the same coloration was in a range of 7 to 11, and all devices were evaluated as a D level or higher.
- e: The number of display devices with the same reflectivity and the same coloration was in a range of 0 to 6, and some devices were evaluated as an E level.

Suppression of Precipitation of Dichroic Substance

The precipitation property of the coloring agent compound in a case of aging the composition for forming a light absorption anisotropic layer at room temperature was evaluated according to the following evaluation standards. The evaluation results are listed in Table 1. The evaluation result of C or higher is a practically acceptable level.

Evaluation Standards
- A: Precipitation of the coloring agent did not occur even after 7 days.
- B: Occurrence of precipitation was not observed after 3 days, but precipitation was observed after 7 days.
- C: Occurrence of precipitation was not observed after 1 day, but precipitation was observed after 3 days.
- D: Precipitation was observed after 1 day.

TABLE 1

| | Base material | | Photo-alignment film | | | | Light absorption anisotropic layer | | Change in tint of reflected light during black display | Uniformity | Suppression of precipitation of dichroic substance |
| | | | | Specific compound | | | | Total amount of dichroic substance having maximal absorption wavelength in | | | |
| | Type | Tg (° C.) | Type | Type | Refractive index | Molecular weight | Content (mg/cm³) | Type | wavelength range of 550 to 700 nm | | | |
|---|---|---|---|---|---|---|---|---|---|---|---|---|
| Example 1 | Film 1 | 180 | PA1 | Compound 1 | 1.65 | 442 | 0.84 | P1 | 50 mg/cm³ | C | a | A |
| Example 2 | Film 1 | 180 | PA2 | Compound 1 | 1.65 | 442 | 4.8 | P1 | 50 mg/cm³ | A | a | A |
| Example 3 | Film 1 | 180 | PA3 | Compound 2 | 1.58 | 491 | 4.8 | P1 | 50 mg/cm³ | C | a | A |
| Example 4 | Film 1 | 100 | PA4 | Compound 3 | 1.59 | 697 | 4.9 | P1 | 50 mg/cm³ | C | a | A |
| Example 5 | Film 1 | 180 | PA5 | Compound 4 | 1.56 | 356 | 4.8 | P1 | 50 mg/cm³ | C | a | A |
| Example 6 | Film 1 | 180 | PA6 | Compound 5 | 1.58 | 519 | 4.8 | P1 | 50 mg/cm³ | C | a | A |
| Example 7 | Film obtained by saponifying film 1 | 180 | PA1 | Compound 1 | 1.65 | 442 | 0.84 | P1 | 50 mg/cm³ | B | a | A |
| Example 8 | Film 3 [Arton] | 170 | PA2 | Compound 1 | 1.65 | 442 | 4.8 | P1 | 50 mg/cm³ | B | b | A |
| Example 9 | Film 4 | 180 | PA2 | Compound 1 | 1.65 | 442 | 4.8 | P1 | 50 mg/cm³ | B | a | A |
| Example 10 | Film 1 | 180 | PA7 | Compound 6 | 1.61 | 228 | 4.8 | P1 | 50 mg/cm³ | B | a | A |
| Example 11 | Film 1 | 180 | PA8 | Compound 7 | 1.59 | 1315 | 4.8 | P1 | 50 mg/cm³ | D | a | A |
| Example 12 | Film 1 | 180 | PA2 | Compound 1 | 1.65 | 442 | 4.8 | P2 | 50 mg/cm³ | A | a | C |
| Example 13 | Film 1 | 180 | PA2 | Compound 1 | 1.65 | 442 | 4.8 | P3 | 100 mg/cm³ | A | a | A |

TABLE 1-continued

| | Base material | | Photo-alignment film | | | | Light absorption anisotropic layer | | Change in tint of reflected light during black display | Uniformity | Suppression of precipitation of dichroic substance |
| | | | | Specific compound | | | | Total amount of dichroic substance of having maximal absorption wavelength in wavelength range of 550 to 700 nm | | | | |
| | Type | Tg (° C.) | Type | Type | Refractive index | Molecular weight | Content (mg/cm³) | Type | | | | |
|---|---|---|---|---|---|---|---|---|---|---|---|---|
| Comparative Example 1 | Film 2 [Acryl] | 115 | PA1 | Compound 1 | 1.65 | 442 | 0.84 | P1 | 50 mg/cm³ | C | e | A |
| Comparative Example 2 | Film 1 | 160 | PA7 | — | — | — | — | P1 | 50 mg/cm³ | E | — | A |

As shown in the results listed in Table 1, it was found that the uniformity of the prepared optical laminate was degraded in a case where the glass transition temperature of the base material was lower than 150° C. (Comparative Example 1).

Further, it was found that a change in tint (coloration) occurred in the reflected light during black display in a case where the photo-alignment film did not contain a specific compound (Comparative Example 2).

On the contrary, it was found that in a case where the glass transition temperature of the base material was 150° C. or higher and the photo-alignment film contained the specific compound, the uniformity of the optical laminate was excellent, and a change in tint of reflected light during black display could be suppressed in a case where the optical laminate was used for the image display device (Examples 1 to 13).

In particular, based on the comparison between Example 1 and Example 7, it was found that in a case where the distribution of the content of the alkali metal ions contained in the base material in the thickness direction was a distribution in which the content in the surface layer portion corresponding to 1% of the thickness from the surface of the base material on a side of the photo-alignment film was three or more times the content in the central portion of the base material in the thickness direction, the reflected light during black display in a case where the optical laminate was used for the image display device could be suppressed.

In addition, based on the comparison between Example 2 and Example 8, it was found that in a case where the Tg of the base material was higher than 170° C., the uniformity of the optical laminate was excellent, and a change in tint of reflected light during black display could be further suppressed in a case where the optical laminate was used for the image display device.

In addition, based on the comparison between Example 2 and Example 9, it was found that in a case where the base material satisfied at least one of Condition 1 or Condition 2, a change in tint of reflected light during black display could be further suppressed in a case where the optical laminate was used for the image display device.

In addition, based on the comparison between Example 2 and Example 10, it was found that in a case where the refractive index of the specific compound was in a range of 1.62 to 1.70, a change in tint of reflected light during black display could be further suppressed in a case where the optical laminate was used for the image display device.

In addition, based on the comparison between Example 2 and Example 11, it was found that in a case where the molecular weight of the specific compound was 1000 or less, a change in tint of reflected light during black display could be further suppressed in a case where the optical laminate was used for the image display device.

What is claimed is:

1. An optical laminate comprising:
    a light absorption anisotropic layer containing a dichroic substance;
    a photo-alignment film; and
    a base material in order, wherein the photo-alignment film contains a specific compound having a refractive index of 1.55 to 1.70,
    wherein the base material has a glass transition temperature of 150° C. or higher, and
    wherein the specific compound is a compound represented by any of Formulae (1) to (3), B-(G-A)$n$-G-B    (1)

in Formula (1),
    n represents an integer of 0 or greater,
    B represents an acyl group having at least one aromatic ring, where a plurality of B's may be the same as or different from each other,
    G represents an alkylene glycol residue, an aryl glycol residue, or an oxyalkylene glycol residue, where in a case where n represents an integer of 1 or greater, a plurality of G's may be the same as or different from each other, and
    A represents an alkylene dicarboxylic acid residue or an aryl dicarboxylic acid residue, where in a case where n represents an integer of 2 or greater, a plurality of A's may be the same as or different from each other,

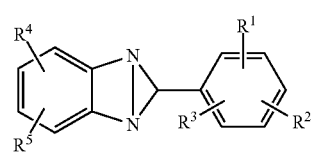

(2)

in Formula (2),
$R^1$, $R^2$, $R^3$, $R^4$, and $R^5$ each independently represent a hydrogen atom, a halogen atom, a nitro group, a hydroxy group, an alkyl group which may have a substituent, an alkenyl group which may have a substituent, an aryl group which may have a substituent, an alkoxy group which may have a substituent, an acyloxy group which may have a substituent, an aryloxy group which may have a substituent, an alkylthio group which may have a substituent, an arylthio group which may have a substituent, a mono- or dialkylamino group which may have a substituent, an acylamino group which may have a substituent, or a 5- to 6-membered heterocyclic group, where $R^4$ and $R^5$ may be bonded to each other to form a 5- to 6-membered carbon ring,

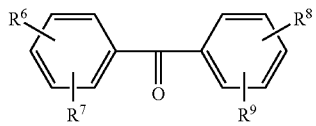

(3)

in Formula (3), $R^6$, $R^7$, $R^8$, and $R^9$ each independently represent a hydrogen atom, a halogen atom, a hydroxy group, an alkyl group which may have a substituent, an alkenyl group which may have a substituent, an alkoxy group which may have a substituent, a phenyl group which may have a substituent, a cycloalkyl group which may have a substituent, an alkylcarbonyl group which may have a substituent, an alkylsulfonyl group which may have a substituent, or a —CO(NH)$_{m-1}$-D group, D represents an alkyl group which may have a substituent, an alkenyl group which may have a substituent, or a phenyl group which may have a substituent, and m represents 1 or 2.

2. The optical laminate according to claim 1,
wherein B in Formula (1) represents a group represented by Formula (4),

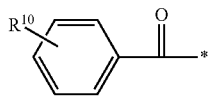

(4)

in Formula (4),

"*" represents a bonding position, and $R^{10}$ represents a hydrogen atom, an alkyl group which may have a substituent, a carboxy group, or a hydroxy group.

3. The optical laminate according to claim 1,
wherein A in Formula (1) represents a dicarboxylic acid residue represented by Formula (5),

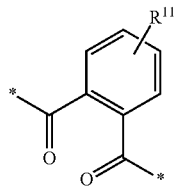

(5)

in Formula (5),

"*" represents a bonding position, and $R^{11}$ represents a hydrogen atom, an alkyl group which may have a substituent, a carboxy group, or a hydroxy group.

4. The optical laminate according to claim 2,
wherein A in Formula (1) represents a dicarboxylic acid residue represented by Formula (5),

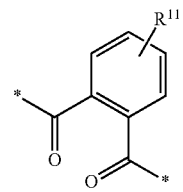

(5)

in Formula (5),

"*" represents a bonding position, and $R^{11}$ represents a hydrogen atom, an alkyl group which may have a substituent, a carboxy group, or a hydroxy group.

5. The optical laminate according to claim 1,
wherein a content of the specific compound contained in the photo-alignment film is in a range of 0.1 to 150 mg/cm$^3$.

6. An optical laminate comprising:
a light absorption anisotropic layer containing a dichroic substance;
a photo-alignment film; and
a base material in order,
wherein the photo-alignment film contains a specific compound having a refractive index of 1.55 to 1.70,
wherein the base material has a glass transition temperature of 150° C. or higher, and
wherein the base material consists of a cellulose acylate-based film that satisfies at least one of Condition 1 or Condition 2,
Condition 1: the cellulose acylate-based film contains 1% to 20% by mass of a compound represented by Formula (1)
Condition 2: the cellulose acylate-based film contains 0.1% to 10% by mass of a compound represented by Formula (2) or (3)

B-(G-A)$n$-G-B (1)

in Formula (1), n represents an integer of 0 or greater,

B represents an acyl group having at least one aromatic ring, where a plurality of B's may be the same as or different from each other, G represents an alkylene glycol residue, an aryl glycol residue, or an oxyalkylene glycol residue, where in a case where n represents an integer of 1 or greater, a plurality of G's may be the same as or different from each other, and A represents an alkylene dicarboxylic acid residue or an aryl dicarboxylic acid residue, where in a case where n represents an integer of 2 or greater, a plurality of A's may be the same as or different from each other,

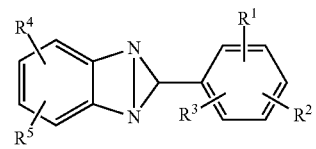

(2)

in Formula (2),

R¹, R², R³, R⁴, and R⁵ each independently represent a hydrogen atom, a halogen atom, a nitro group, a hydroxy group, an alkyl group which may have a substituent, an alkenyl group which may have a substituent, an aryl group which may have a substituent, an alkoxy group which may have a substituent, an acyloxy group which may have a substituent, an aryloxy group which may have a substituent, an alkylthio group which may have a substituent, an arylthio group which may have a substituent, a mono-or dialkylamino group which may have a substituent, an acylamino group which may have a substituent, or a 5- to 6-membered heterocyclic group, where R⁴ and R⁵ may be bonded to each other to form a 5- to 6-membered carbon ring,

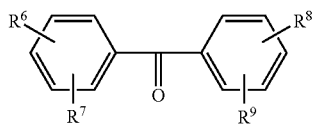
(3)

in Formula (3),

R⁶, R⁷, R⁸, and R⁹ each independently represent a hydrogen atom, a halogen atom, a hydroxy group, an alkyl group which may have a substituent, an alkenyl group which may have a substituent, an alkoxy group which may have a substituent, a phenyl group which may have a substituent, a cycloalkyl group which may have a substituent, an alkylcarbonyl group which may have a substituent, an alkylsulfonyl group which may have a substituent, or a —CO(NH)$_{m-1}$-D group, D represents an alkyl group which may have a substituent, an alkenyl group which may have a substituent, or a phenyl group which may have a substituent, and m represents 1 or 2.

7. The optical laminate according to claim 6, wherein a distribution of a content of at least one of a sodium ion or a potassium ion contained in the base material in a thickness direction is a distribution in which a content in a surface layer portion corresponding to 1% of a thickness from a surface of the base material on a side of the photo-alignment film is three or more times a content in a central portion of the base material in the thickness direction.

* * * * *